(12) United States Patent
Kobayashi et al.

(10) Patent No.: US 7,342,771 B2
(45) Date of Patent: Mar. 11, 2008

(54) SOLID ELECTROLYTIC CAPACITOR AND A METHOD FOR MANUFACTURING A SOLID ELECTROLYTIC CAPACITOR

(75) Inventors: Masaaki Kobayashi, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 214 days.

(21) Appl. No.: 10/518,687

(22) PCT Filed: Jun. 18, 2003

(86) PCT No.: PCT/JP03/07734

§ 371 (c)(1),
(2), (4) Date: Aug. 17, 2005

(87) PCT Pub. No.: WO03/107365

PCT Pub. Date: Dec. 24, 2003

(65) Prior Publication Data

US 2006/0109609 A1    May 25, 2006

(30) Foreign Application Priority Data

Jun. 18, 2002   (JP) .............................. 2002-177573

(51) Int. Cl.
*H01G 9/00* (2006.01)
(52) U.S. Cl. ............... 361/523; 361/516; 361/519; 361/525; 361/528; 361/534; 29/25.01; 29/25.03
(58) Field of Classification Search ............... 361/523, 361/525, 528–529, 516–519, 530–534; 29/25.01, 29/25.03
See application file for complete search history.

(56) References Cited

U.S. PATENT DOCUMENTS

| | | | | |
|---|---|---|---|---|
| 4,090,231 | A | * | 5/1978 | Millard et al. ............... 361/529 |
| 4,831,494 | A | | 5/1989 | Arnold et al. ............... 361/306 |
| 5,369,545 | A | | 11/1994 | Bhattacharyya et al. . 361/306.2 |
| 5,390,074 | A | * | 2/1995 | Hasegawa et al. .......... 361/540 |
| 5,880,925 | A | | 3/1999 | DuPré et al. ............... 361/303 |
| 6,042,740 | A | * | 3/2000 | Uehara et al. ............. 252/62.2 |
| 6,504,705 | B2 | * | 1/2003 | Shimada et al. ............ 361/529 |
| 6,508,846 | B2 | * | 1/2003 | Yamada et al. ............ 29/25.03 |

(Continued)

FOREIGN PATENT DOCUMENTS

JP        52-79255 A      7/1977

(Continued)

*Primary Examiner*—Nguyen T. Ha
(74) *Attorney, Agent, or Firm*—Seed IP Law Group PLLC

(57) ABSTRACT

A solid electrolytic capacitor is provided, which can reduce impedance, particularly, the ESL and the ESR. In one embodiment, such a solid electrolytic capacitor comprises a foil-like valve metal substrate formed with an insulating oxide film on the surface thereof, a valve metal body whose one end portion region is bonded to one of two opposite end portion regions of the foil-like valve metal substrate, a conductive metal substrate whose one end portion region is bonded to the other end portion region of the foil-like valve metal substrate, a cathode electrode formed by sequentially laminating at least a solid high molecular polymer electrolyte layer and a conductive layer on the surface of the foil-like valve metal substrate, and a cathode lead electrode being drawn out from the cathode electrode in a direction perpendicular to one major surface of the foil-like valve metal substrate.

5 Claims, 18 Drawing Sheets

U.S. PATENT DOCUMENTS

| | | | |
|---|---|---|---|
| 6,696,138 B2* | 2/2004 | Sakai et al. | 428/209 |
| 6,783,703 B2* | 8/2004 | Monden et al. | 252/511 |
| 6,985,353 B2* | 1/2006 | Hirota et al. | 361/528 |
| 7,099,145 B2* | 8/2006 | Kobayashi et al. | 361/523 |

FOREIGN PATENT DOCUMENTS

| | | |
|---|---|---|
| JP | 58-191414 | 11/1983 |
| JP | 62-189715 | 8/1987 |
| JP | 62-189716 | 8/1987 |
| JP | 02-54510 A | 2/1990 |
| JP | 04-074853 A | 3/1992 |
| JP | 6-31715 | 8/1994 |
| JP | 7-27144 | 1/1995 |
| JP | 08-031400 A | 2/1996 |
| JP | 2725553 B2 | 12/1997 |
| JP | 2950587 B2 | 7/1999 |
| JP | 11-288846 A | 10/1999 |
| JP | 2000-100665 A | 4/2000 |
| JP | 2000-311832 A | 11/2000 |
| JP | 2001-307955 | 11/2001 |
| JP | 2002-313676 | 10/2002 |
| JP | 2006-267801 A | 10/2006 |
| JP | 2006-267802 A | 10/2006 |

* cited by examiner

US 7,342,771 B2

SOLID ELECTROLYTIC CAPACITOR AND A METHOD FOR MANUFACTURING A SOLID ELECTROLYTIC CAPACITOR

FIELD OF THE INVENTION

The present invention relates to a solid electrolytic capacitor and a method for manufacturing a solid electrolytic capacitor and, particularly, to a solid electrolytic capacitor which is constituted by forming a solid high molecular polymer electrolyte layer and a conductive layer on a foil-like valve metal substrate formed with an insulating oxide film on the surface thereof and can reduce impedance and increase electrostatic capacitance and a method for manufacturing the same.

DESCRIPTION OF THE PRIOR ART

An electrolytic capacitor is conventionally formed by employing a so-called valve metal capable of forming an insulating oxide film such as aluminum, titanium, brass, nickel, tantalum or the like as an anode, anodizing the surface of the valve metal to form an insulating oxide film thereon, forming an electrolyte layer substantially serving as a cathode, and forming a conductive layer of graphite, silver or the like as a cathode.

For example, an aluminum electrolytic capacitor is formed by employing as an anode a porous aluminum foil whose specific surface area is increased by etching, and providing a separation paper impregnated with an electrolytic solution between an aluminum oxide layer formed on the surface of the anode and a cathode foil.

In general, although an electrolytic capacitor using an electrolytic solution for an electrolyte layer between an insulating oxide film and a cathode has the disadvantage that its lifetime is determined by liquid leakage, evaporation of the electrolytic solution and the like, a solid electrolytic capacitor using a solid electrolyte containing metal oxide or organic compounds does not have such a disadvantage and is preferable.

Manganese dioxide is a typical metal oxide usable for the solid electrolyte of a solid electrolytic capacitor. On the other hand, as an organic compound usable for the solid electrolyte of a solid electrolytic capacitor, 7,7,8,8-tetracyanoxydimenthane (TCNQ) complex salt disclosed in Japanese Patent Application Laid Open No. 52-79255 and Japanese Patent Application Laid Open No. 58-191414 can be cited.

Recently, as the frequency of power circuits of electronic devices has become higher, corresponding performance is required of capacitors used therewith. However, a solid electrolytic capacitor using a solid electrolyte layer containing manganese dioxide or TCNQ complex salt has the following disadvantages.

Although a solid electrolyte layer containing manganese dioxide is generally formed by repeating thermal decomposition of manganese nitrate, an insulating oxide film is damaged or degraded by heat applied during thermal decomposition or oxidative effect of NOx gas generated during thermal decomposition. Therefore, in the case where a solid electrolyte layer is formed using manganese dioxide, leakage current becomes high, for example, and various characteristics of the capacitor finally obtained tend to be lowered. Further, in the case where a solid electrolyte layer is formed using manganese dioxide, the solid electrolytic capacitor has the disadvantage that impedance thereof becomes higher in the high frequency region.

On the other hand, a solid electrolytic capacitor using TCNQ complex salt does not adequately satisfy the requirement for low impedance of current solid electrolytic capacitors, since the electric conductivity of TCNQ complex salt is about 1 S/cm or lower. It has been further pointed out that the reliability of a solid electrolytic capacitor using TCNQ complex salt as a solid electrolyte is not sufficient for the reason that adhesive strength between TCNQ complex salt and an insulating oxide film is low and the thermal stability of TCNQ complex salt during soldering and with lapse of time is low, and the like. In addition, TCNQ complex salt is expensive and, therefore, the cost of a solid electrolytic capacitor using TCNQ complex salt as a solid electrolyte is high.

For solving these problems occurring when manganese dioxide or TCNQ complex salt is used as a solid electrolyte and obtaining a solid electrolytic capacitor having better characteristics, it has been proposed to use as a solid electrolyte a high molecular compound having high electric conductivity whose manufacturing cost is relatively low, whose adhesive strength to an insulating oxide film is relatively good and whose thermal stability is excellent.

For example, Japanese Patent No. 2,725,553 discloses a solid electrolytic capacitor in which polyaniline formed on an insulating oxide film on the surface of an anode by the chemical oxidation polymerization process.

Further, Japanese Patent Publication No. 8-31400 proposes a solid electrolytic capacitor in which a thin film of metal or manganese dioxide is formed on an insulating oxide film and a conductive polymer film of polypyrrole, polythiophene, polyaniline, polyfuran or the like is formed on the thin film of metal or manganese dioxide by the electrolysis polymerization process, for the reason that it is difficult to form a conductive polymer film having high strength on an insulating oxide film on the surface of an anode only by the chemical oxidation polymerization process and that it is impossible or extremely difficult to directly form an electrolysis polymerization film on an insulating oxide film on the surface of an anode by the electrolysis polymerization process because the insulating oxide film on the surface of an anode is a non-conductor.

Furthermore, Japanese Patent Publication No. 4-74853 proposes a solid electrolytic capacitor in which a conductive polymer film of polypyrrole, polythiophene, polyaniline, polyfuran or the like is formed on an insulating oxide film by the chemical oxidation polymerization process.

On the other hand, size reduction and performance enhancement of an electronic component is required in proportion as the need to reduce the size and thickness of electronic devices increases and as the need increases for a high-performance circuit board capable of being reduced in size and increased in number of layers. In particular, since IC cards are being reduced to a very thin thickness of 1 mm or less and portable personal computers are being reduced to a very thin thickness of 20 mm or less, it is required to form an electronic component to be mounted therein and a printed circuit board on which electronic components are mounted so as to have a thickness of several millimeters to several hundreds of microns.

However, since each of the above mentioned solid electrolytic capacitors is fabricated as an independent component and mounted on a printed circuit board via a solder layer, it is impossible to sufficiently increase the degree of integration and density of an electronic component.

Therefore, Japanese Patent Application Laid Open No. 2-54510 and Japanese Patent No. 2950587 propose to integrally form solid electrolytic capacitors with a board in the manner of forming resistances and conductive patterns on a board, to form a circuit board in which a plurality of solid electrolytic capacitors are formed on a single board, thereby increasing the density of electronic components and reducing the thickness of circuit boards.

More specifically, Japanese Patent Application Laid Open No. 2-54510 discloses a method for fabricating a circuit board having a built-in solid electrolytic capacitor by forming an electric conductor and a conductive pattern of a film-like valve metal substrate such as an aluminum film capable of forming an insulating oxide film on an insulating substrate and sequentially forming an insulating oxide film layer, a conductive polymer layer of a heterocyclic compound and a conductive layer at one portion or several portions of the surface of the pattern of the valve metal substrate and, a multi-layered circuit board having a built-in solid electrolytic capacitor fabricated by laminating a circuit board having a built-in solid electrolytic capacitor fabricated by forming an electric conductor and a conductive pattern of a film-like valve metal substrate such as an aluminum film capable of forming an insulating oxide film on each of both surfaces of an insulating substrate and sequentially forming an insulating oxide film layer, a conductive polymer layer of a heterocyclic compound and a conductive layer at one portion or several portions of the surface of the pattern of the valve metal substrate. According to Japanese Patent Application Laid Open No. 2-54510, the density of electronic components can be increased without mounting individual capacitors on a circuit board by integrally forming a solid electrolytic capacitor using electro-conductive polymer with a board in advance in the manner of forming a resistance layer and a conductive pattern of a circuit board, and the electronic characteristics of an electronic component, such as its noise characteristic, can be simultaneously improved.

On the other hand, Japanese Patent No. 2950587 discloses a solid electrolytic capacitor fabricated by sequentially forming a dielectric layer, an electrolytic layer and a conductive layer on each of surfaces of a plate-like anode substrate, namely, a valve metal substrate. and providing a cathode terminal via each of the conductive layers to form a capacitor component, and bonding circuit boards each having desired wiring on the opposite surfaces of the thus formed capacitor component via resin layers. According to Japanese Patent No. 2950587, since a solid electrolyte is protected by the printed circuit boards disposed on opposite side surfaces thereof even if it is mechanically brittle, a reliable sold electrolytic capacitor can be obtained and it is further possible to easily mount other electronic components on a printed circuit board by forming a desired wiring pattern on the printed circuit board in advance.

In order to reduce impedance, it is necessary to lower the equivalent series inductance (ESL) and equivalent series resistance (ESR) of capacitors used in the electronic devices and it is particularly necessary to sufficiently lower the ESL in the electronic devices including the power circuits of low frequency. As methods for decreasing the ESL, there are generally known a first method of shortening the length of the electric path as possible, a second method of canceling the magnetic field generated by one electric path by the magnetic field generated by another electric path, and a third method of dividing an electric path into n pieces to decrease the effective ESL to 1/n. For example, the first method and the third method are employed in the invention taught by Japanese Patent Application Laid Open No. 2000-311832, the second method and the third method are employed in the invention taught by Japanese Patent Application Laid Open No. 06-267802 and the third method is employed in the inventions taught by Japanese Patent Application Laid Open No. 06-267801 and Japanese Patent Application Laid Open No. 11-288846.

As described above, the frequency of the power circuits of electronic devices has recently become higher and this has made it necessary to lower the equivalent series inductance (ESL) and equivalent series resistance (ESR) of capacitors used in the electronic devices. Therefore, it is required to develop an electrolytic capacitor in which the initial characteristic ESL and ESR values are very low.

SUMMARY OF THE INVENTION

It is therefore an object of the present invention to provide a solid electrolytic capacitor which is constituted by forming at least a solid high molecular polymer electrolyte layer and a conductive layer on a foil-like valve metal substrate formed with an insulating oxide film on the surface thereof and can reduce the ESL and the ESR and increase electrostatic capacitance at a small size, and a method for manufacturing such a solid electrolytic capacitor.

The above object of the present invention can be accomplished by a solid electrolytic capacitor comprising at least one solid electrolytic capacitor component comprising a foil-like valve metal substrate formed with an insulating oxide film on the surface thereof, a valve metal body whose one end portion region is bonded to one of two opposite end portion regions of the foil-like valve metal substrate so that electric connection can be established between the valve metals, a conductive metal substrate whose one end portion region is bonded to the other end portion region of the foil-like valve metal substrate so that electric connection can be established between the metals and a cathode electrode formed by sequentially laminating at least a solid high molecular polymer electrolyte layer and a conductive layer on the surface of the foil-like valve metal substrate, a cathode lead electrode being drawn out from the cathode electrode in a direction perpendicular to one major surface of the foil-like valve metal substrate.

According to the present invention, particularly when a three-terminal type solid electrolytic capacitor is fabricated in accordance with the present invention, it is possible to reduce ESL by dividing the electrical current path and since the lead length of the cathode lead electrode can be shortened, it is possible to markedly reduce the ESL.

The above object of the present invention can be also accomplished by a solid electrolytic capacitor comprising at least two solid electrolytic capacitor components each comprising a foil-like valve metal substrate formed with an insulating oxide film on the surface thereof, a valve metal body whose one end portion region is bonded to one of two opposite end portion regions of the foil-like valve metal substrate so that electric connection can be established between the valve metals, a conductive metal substrate whose one end portion region is bonded to the other end portion region of the foil-like valve metal substrate so that electric connection can be established between the metals and a cathode electrode formed by sequentially laminating at least a solid high molecular polymer electrolyte layer and a conductive layer on the surface of the foil-like valve metal substrate, the at least two solid electrolytic capacitor components being partly overlapped so as to electrically connect the conductive layers thereof, thereby forming a laminate of the solid electrolytic capacitor components, a cathode lead electrode being drawn out from a surface of one of the cathode electrodes of the laminate of the solid electrolytic capacitor components in a direction perpendicular to one major surface of the foil-like valve metal substrate.

According to the present invention, particularly when a pseudo three-terminal type solid electrolytic capacitor is fabricated in accordance with the present invention, it is possible to reduce the ESL by dividing the electrical current path and since the lead length of the cathode lead electrode can be shortened, it is possible to markedly reduce the ESL. Further, since a plurality of solid electrolytic capacitor components are laminated, it is possible to increase the electrostatic capacitance of the solid electrolytic capacitor.

In a preferred aspect of the present invention, two solid electrolytic capacitor components are disposed to face each other as rotated with respect to each other by 180 degrees.

According to this preferred aspect of the present invention, particularly when fabricating a pseudo three-terminal type solid electrolytic capacitor, it is possible to further divide the electrical current path and reduce the ESL. Further, since the lead length of the cathode lead electrode can be shortened, it is possible to markedly reduce the ESL and since the two solid electrolytic capacitor components are laminated, it is possible to further increase the electrostatic capacitance of the solid electrolytic capacitor.

In a preferred aspect of the present invention, four solid electrolytic capacitor components are disposed to face each other as rotated with respect to each other by 90 degrees.

According to this preferred aspect of the present invention, particularly when fabricating a pseudo five-terminal type solid electrolytic capacitor, it is possible to further divide the electrical current path and reduce the ESL. Further, since the lead length of the cathode lead electrode can be shortened, it is possible to markedly reduce the ESL and since the four solid electrolytic capacitor components are laminated, it is possible to further increase the electrostatic capacitance of the solid electrolytic capacitor.

The above object of the present invention can be also accomplished by a method for manufacturing a solid electrolytic capacitor comprising steps of bonding one end portion region of a valve metal body to one of two opposite end portion regions of a foil-like valve metal substrate formed with an insulating oxide film on the surface thereof so that electric connection can be established between the valve metals, thereby forming an electrode body for a solid electrolytic capacitor component, masking a part of the valve metal body located on one side of the electrode body, dipping, of the whole electrode body, the whole foil-like valve metal substrate, the entire masked portion and a part of the valve metal body which is not masked in a forming solution, applying voltage to the electrode body to effect anodic oxidization thereon and form an insulating oxide film at least at an edge portion of the foil-like valve metal substrate, forming a solid high molecular polymer electrolyte layer on substantially the entire surface of the foil-like valve metal substrate subjected to the anodic oxidization, coating the solid high molecular polymer electrolyte layer with a conductive paste and drying the conductive paste to form a conductive layer, removing the mask of the valve metal body, mounting at least one solid electrolytic capacitor component thus fabricated on a lead frame, bonding one end portion region of an anode lead portion formed in the lead frame in advance to the other end portion of the valve metal body, thereby forming an anode lead electrode, connecting a cathode lead portion formed in the lead frame in advance to the conductive layer, thereby forming a cathode lead electrode so as to be drawn out from the conductive layer in a direction perpendicular to one major surface of the foil-like valve metal substrate, and molding the solid electrolytic capacitor component fixed onto the lead frame with resin.

According to the present invention, it is possible to provide a three-terminal type solid electrolytic capacitor which can divide the electrical current path, thereby reducing the ESL, and shorten the lead length of the cathode lead electrode, thereby markedly reducing the ESL.

The above object of the present invention can be also accomplished by a method for manufacturing a solid electrolytic capacitor comprising steps of bonding one end portion region of a valve metal body to one of two opposite end portion regions of a foil-like valve metal substrate formed with an insulating oxide film on the surface thereof so that electric connection can be established between the valve metals, thereby forming an electrode body for a solid electrolytic capacitor component, dipping the electrode body in a forming solution so that the whole foil-like valve metal substrate is dipped in the forming solution, applying voltage to the electrode body to effect anodic oxidization thereon and form an insulating oxide film at least at an edge portion of the foil-like valve metal substrate, forming a solid high molecular polymer electrolyte layer on substantially the entire surface of the foil-like valve metal substrate subjected to the anodic oxidization, coating the solid high molecular polymer electrolyte layer with a conductive paste and drying the conductive paste to form a conductive layer, removing the mask of the foil-like valve metal substrate, repeating these steps to fabricate at least two solid electrolytic capacitor components, partly overlapping the at least two solid electrolytic capacitor components so as to electrically connect the conductive layers thereof, thereby fabricating a laminate of the at least two solid electrolytic capacitor components, mounting the at least two solid electrolytic capacitor components on a lead frame, bonding one end portion region of an anode lead portion formed in the lead frame in advance to the other end portion of the valve metal body, thereby forming an anode lead electrode, connecting a cathode lead portion formed in the lead frame in advance to the conductive layer, thereby forming a cathode lead electrode so as to be drawn out from the conductive layer in a direction perpendicular to one major surface of the foil-like valve metal substrate, and molding the laminate of the solid electrolytic capacitor components fixed onto the lead frame with resin.

According to the present invention, it is possible to provide a pseudo multi-terminal type solid electrolytic capacitor which can divide the electrical current path, thereby reducing the ESL, shorten the lead length of the cathode lead electrode, thereby markedly reducing the ESL, and increase the electrostatic capacitance by laminating a plurality of solid electrolytic capacitor components.

In the present invention, the valve metal substrate is formed of metal or alloy selected from a group consisting of metal capable of forming an insulating oxide film and alloys thereof. Illustrative examples of valve metals preferably usable in the present invention include one kind of metal or alloy of two or more kinds of metal selected from a group consisting of aluminum, tantalum, titanium, niobium and zirconium. Aluminum and tantalum are most preferable. An anodic electrode is formed by processing the metal or alloy into a foil.

In the present invention, the material for making the conductive metal is not particularly limited but may be any type of metal or alloy insofar as it has conductivity. The conductive metal can preferably be made of metal or alloy which can connected by soldering and more preferably be formed of one kind of metal or alloy of two or more kinds of metal selected from a group consisting of copper, brass, nickel, zinc and chromium. Among these, copper is most preferably used for forming the conductive metal from the viewpoint of electric characteristics, workability in following steps, cost and the like.

In the present invention, the solid high molecular polymer electrolyte layer contains a conductive high molecular polymer compound and is preferably formed on the foil-like valve metal substrate whose surface is roughened and is formed with an insulating oxide film by chemical oxidation polymerization or electrolytic oxidation polymerization.

In the case of forming the solid high molecular polymer electrolyte layer using chemical oxidation polymerization, concretely, the solid high molecular polymer electrolyte layer is formed on the foil-like valve metal substrate whose surface is roughened and is formed with an insulating oxide film in the following manner, for example.

First, a solution containing an oxidizing agent at 0.001 to 2.0 mol/liter or a solution to which a compound serving as a dopant is further added is uniformly applied on the foil-like valve metal substrate whose surface is roughened and formed with an insulating oxide film using a coating method or a spray method.

Then, a solution preferably containing raw monomer of a conductive high molecular polymer compound in an amount of at least 0.01 mol/liter, or raw monomer of a conductive high molecular polymer compound itself, is brought into direct contact with the insulating oxide film formed on the surface of the foil-like valve metal substrate, whereby the raw monomers are polymerized to synthesize a conductive high molecular polymer compound and a solid high molecular polymer electrolyte layer of the conductive high molecular polymer compound is formed on the insulating oxide film formed on the surface of the foil-like valve metal substrate.

In the present invention, as a conductive high molecular polymer compound contained in the solid high molecular polymer electrolyte layer, it is preferable to select a compound whose raw monomer is selected from a group consisting of a substituted or non-substituted π-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted Π-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

In the present invention, illustrative examples of raw monomers of conductive high molecular polymer compounds preferably used for the solid high molecular polymer electrolyte layer include (nonsubstituted) anilines, alkyl anilines, alkoxy anilines, halogenated anilines, ortho-phenylenediamines, 2,6-dialkyl anilines, 5-dialkoxy anilines, 4,4'-diaminodiphenyl ether, pyrrole, 3-methylpyrrole, 3-ethylpyrrole, 3-propylpyrrole, thiophene, methylthiophene, 3-ethylthiophene, 3,4-ethylenedioxythiophene and the like.

In the present invention an oxidizing agent used for chemical oxidization polymerization is not particularly limited and for example, iron(III) salts such as iron(III) chloride, iron(III) sulfide and iron(III) ferricyanide, ceric(IV) salts such as ceric sulfate and ceric ammonium nitrate, halides such as iodine, bromine, bromine iodide and the like, metal halides such as silicon pentafluoride, antimony pentafluoride, silicon tetrafluoride, phosphorus pentachloride, phosphorus pentafluoride, aluminum chloride, molybdenum pentachloride and the like, proton acids such as sulfuric acid, nitric acid, fluorosulfonic acid, trifluoromethanesulfuric acid, chlorosulfuric acid and the like, oxygen compounds such as sulfur trioxide, nitrogen dioxide and the like, persulfates such as sodium persulfate, potassium persulfate, ammonium persulfate and the like, and peroxides such as hydrogen peroxide, potassium permanganate, peracetic acid, difluorosulfonyl peroxiside and the like are preferably used as an oxidizing agent.

In the present invention, illustrative examples of compounds serving as a dopant which are added as occasion demands include salts such as $LiPH_6$, $LiAsF_6$, $NaPF_6$, $KPF_6$, $KAsF_6$ whose anion is hexafluorophosphate anion or hexafluoroarsenate (V) anion and whose cation is an alkaline metal cation such as lithium, sodium, potassium and the like; boron tetrafluorides such as $LiBF_4$, $NaBF_4$, $NH_4BF_4$, $(CH_3)_4NBF_4$, $(n-C_4H_9)_4NBF_4$ and the like; sulfonic acids such as p-toluene sulfonic acid, p-ethyl benzene sulfonic acid, p-hydroxybenzene sulfonic acid, dodecylbenzene sulfonic acid, methyl sulfonic acid, dodecyl sulfonic acid, benzene sulfonic acid, B-naphthalene sulfonic acid or the like and derivatives thereof; alkylnaphthalene/sulfonic acids such as butylnaphthalene sodium sulfonate, 2,6-naphthalene sodium disulfonate, toluene sodium sulfonate, toluene tetrabutyl ammonium sulfonate, or the like and the derivatives thereof; metal halides such as ferric chloride, ferric bromide, cupric chloride, cupric bromide or the like; hydrochloric acid, hydrogen bromide, hydrogen iodide, sulfuric acid, phosphoric acid, nitric acid or alkaline metal salt thereof, alkaline earth metal salt thereof or ammonium salt thereof; halogen acid such as perhalogen acid or a salt thereof such as perchloric acid, sodium perchlorate or the like; inorganic acid or a salt thereof; halogenated carboxylic acids such as monocarboxylic acid or dicarboxylic acid such as acetic acid, oxalic acid, formic acid, butyric acid, succinic acid, lactic acid, citric acid, phthalic acid, maleic acid, benzoic acid, salicylic acid, nicotinic acid or the like, aromatic heterocyclic carboxylic acid, trifluoroacetic acid and salts thereof.

In the present invention, each of the oxidizing agent and the compound serving as a dopant is dissolved in water or an organic solvent and used in the form of a suitable solution. A single kind of solvent or mixed solvents may be used. It is effective to use mixed solvents for increasing the solubility of a compound serving as a dopant. It is preferable for solvents used in mixed solvents to have compatibility therewith and compatibility with an oxidizing agent and the compound serving as a dopant. Illustrative examples of solvents include organic amides, sulphur-containing compounds, esters and alcohols.

On the other hand, in the case of forming the solid high molecular polymer electrolyte layer on the foil-like valve metal substrate whose surface is roughened and is formed with an insulating oxide film by electrolytic oxidation polymerization, as well known, a conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Concretely, a thin conductive base layer is first formed preferably by chemical oxidization polymerization on the foil-like valve metal substrate whose surface is roughened and which is formed with an insulating oxide film. The thickness of the conductive base layer is controlled by controlling the number of repetitions of the polymerization under the same polymerization condition. The number of polymerization repetitions is determined depending upon the kind of raw monomer.

The conductive base layer may be formed of metal, metal oxide having conductivity or a conductive high molecular polymer compound but it is preferable to form the conductive base layer of a conductive high molecular polymer compound. As the raw monomer for forming the conductive base layer, a raw monomer used for chemical oxidization polymerization can be employed and in such a case, a conductive high molecular polymer compound contained in the conductive base layer is the same as that contained in the solid high molecular polymer electrolyte layer formed by chemical oxidization polymerization.

In the case where ethylene dioxythiophene or pyrrole is employed as raw monomer for forming the conductive base layer, the conductive base layer may be formed by determining the number of polymerization repetitions so that an amount of the conductive high molecular polymer compound to be produced becomes equal to 10% to 30% of the amount of the conductive high molecular polymer compound produced when the solid high molecular polymer electrolyte layer is formed only by chemical oxidization polymerization.

Thereafter, the conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Various additives may as occasion demands be added to an electrolytic solution in addition to raw monomer of a conductive high molecular polymer compound and supporting electrolyte.

The conductive high molecular polymer compound usable for forming the solid high molecular polymer electrolyte layer is the same as that used for the conductive base layer and, therefore, the same as that used for chemical oxidization polymerization, and it is preferable to select a conductive high molecular polymer compound whose raw monomer is selected from a group consisting of a substituted or non-substituted Π-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted Π-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

The supporting electrolyte is selected depending upon the combination of a monomer and a solvent and illustrative examples of the supporting electrolyte include sodium hydroxide, potassium hydroxide, ammonium hydroxide, sodium carbonate, sodium acid carbonate and the like as a basic compound, sulfuric acid, hydrochloric acid, nitric acid, hydrogen bromide, perchloric acid, trifluoroacetic acid, sulfonic acid and the like as an acidic compound, and sodium chloride, sodium bromide, potassium iodide, potassium chloride, potassium nitrate, sodium periodate, sodium perchlorate, lithium perchlorate, ammonium iodide, ammonium chloride, fluoroborate, tetramethylammonium chloride, tetraethylammonium chloride, tetramethylammonium bromide, tetraethylammonium bromide, tetraethylammonium perchloride, tetrabutylammonium perchloride, tetramethylammonium, D-toluenesulfonic acid chloride, poly(di-salicylic acid triethylamine), 10-camphorsulfonic acid sodium salt and the like as a salt.

In the present invention, the concentration of the supporting electrolyte may be determined so as obtain desired electrical current density and is not particularly limited. The concentration of the supporting electrolyte is generally set to 0.05 to 1.0 mol/liter.

In the present invention, the solvent used for electrolytic oxidation polymerization is not particularly limited and may be selected from water, a protic solvent, an aprotic solvent or a mixed solvent containing two or more these solvents. As the mixed solvent, it is preferable to select a mixed solvent containing solvents having compatibility and compatible with the monomer and the supporting electrolyte.

Illustrative examples of a protic solvent usable in the present invention include formic acid, acetic acid, propionic acid, methanol, ethanol, n-propanol, iso-propanol, tert-butanol, methyl cellosolve, diethylamine, ethylenediamine and the like.

Illustrative examples of an aprotic solvent usable in the present invention include methylene chloride, 1,2-dichloroethane, carbon disulfide, acetonitrile, acetone, propylene carbonate, nitromethane, nitrobenzene, ethyl acetate, diethyl ether, tetrahydrofuran, dimethoxyethane, dioxane, N,N-dimethylacetamide, N,N-dimethylformamide, pyridine, dimethyl sulfoxide and the like.

In the present invention, in the case where the solid high molecular polymer electrolyte layer is formed by electrolytic oxidation polymerization, any of a constant voltage method, a constant electrical current method and a potential sweep method may be employed. Further, during the process of electrolytic oxidation polymerization, a conductive high molecular polymer compound may be polymerized by combining the constant voltage method and the constant electrical current method. The electrical current density is not particularly limited but is about 50 mA/cm$^2$ at the maximum.

In the present invention, as disclosed in Japanese Patent Application Laid Open No. 2000-100665, chemical oxidation polymerization or electrolytic oxidation polymerization can be performed while an ultrasonic wave is being projected, thereby polymerizing a conductive high molecular polymer compound. In the case of polymerizing a conductive high molecular polymer compound while an ultrasonic wave is being projected, the film quality of the solid high molecular polymer electrolyte layer can be improved.

In the present invention, the thickness of the solid high molecular polymer electrolyte layer is not particularly limited insofar as raised and depressed portions formed on the surface of an anode electrode formed by the etching process or the like can be completely filled by the solid high molecular polymer electrolyte layer. The thickness of the solid high molecular polymer electrolyte layer is generally 5 to 100 μm.

In the present invention, the solid electrolytic capacitor further includes a conductive layer serving as a cathode electrode on the solid high molecular polymer electrolyte layer and a graphite paste layer and a silver paste layer may be formed as the conductive layer. The graphite paste layer and the silver paste layer can be formed by a screen printing method, a spray coating method or the like. Although the cathode electrode can be formed by only the silver paste layer, in the case of further forming the graphite paste layer, it is possible to prevent the migration of silver in comparison with the case of forming only the silver paste layer.

When the graphite paste layer and the silver paste layer are to be formed as the cathode electrode, portions other than a portion corresponding to that of the foil-like valve metal substrate whose surface is roughened and which is formed with an insulating oxide film are masked by a metal mask or the like and the graphite paste layer and the silver paste layer are formed at only the portion corresponding to that of the foil-like valve metal substrate whose surface is roughened and which is formed with an insulating oxide film.

DESCRIPTION OF THE PREFERRED EMBODIMENTS

Hereinafter, preferred embodiments of the present invention will be described in detail with reference to accompanying drawings.

Figure 1:
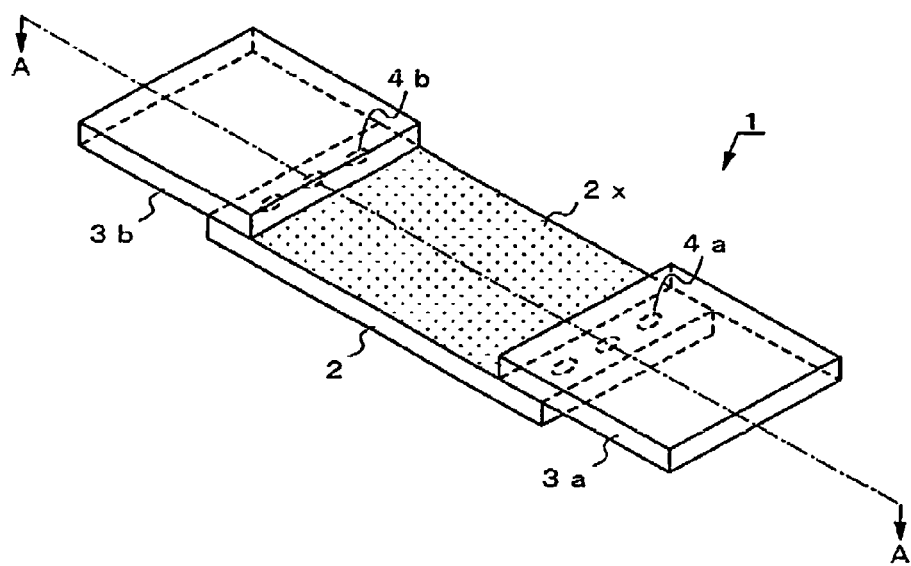
FIG. 1 is a schematic perspective view showing an electrode body for a solid electrolytic capacitor component used for a solid electrolytic capacitor which is a preferred embodiment of the present invention.
Figure 2:
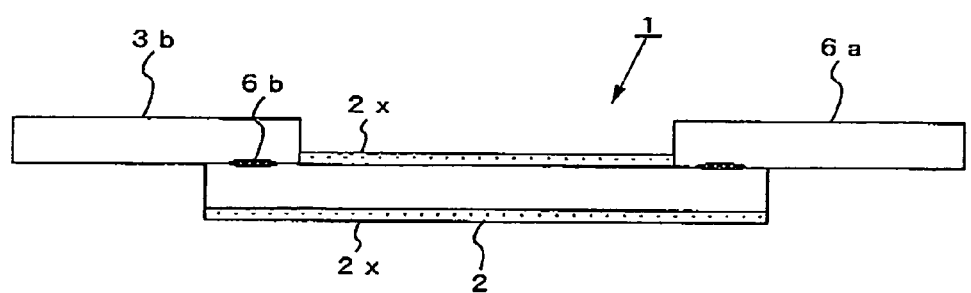
FIG. 2 is a schematic cross sectional view of an electrode body for a solid electrolytic capacitor component taken along a line A-A in FIG. 1.

FIG. 1 is a schematic perspective view showing an electrode body for a solid electrolytic capacitor component (hereinafter sometimes simply referred to as an electrode) used for a solid electrolytic capacitor which is a preferred embodiment of the present invention and FIG. 2 is a schematic cross sectional view of the electrode body for a solid electrolytic capacitor component taken along a line A-A in FIG. 1.

In this embodiment, aluminum is used as a valve metal capable of forming an insulating oxide film and as shown in FIGS. 1 and 2, an electrode body 1 of the solid electrolytic capacitor according to this embodiment includes a foil-like aluminum substrate 2 whose surface is roughened or enlarged and which is formed with an aluminum oxide film 2x on the surface thereof as an insulating oxide film and two foil-like aluminum substrates 3a, 3b whose surfaces are not roughened.

To one end portion region of the foil-like aluminum substrate 2 whose surface is roughened and which is formed with an aluminum oxide film 2x on the surface thereof, one end portion region of the foil-like aluminum substrate 3a whose surface is not roughened is bonded by ultrasonic welding so as to establish electrical connection between the valve metals. Further, to the other end portion region of the foil-like aluminum substrate 2 whose surface is roughened and which is formed with an aluminum oxide film 2x on the surface thereof, one end portion region of the foil-like aluminum substrate 3b whose surface is not roughened is bonded by ultrasonic welding so as to establish electrical connection between the valve metals.

When the electrode body 1 is to be formed, the foil-like aluminum substrate 2 is first cut so as to have a predetermined size from an aluminum foil sheet whose surface is roughened and which is formed with an aluminum oxide film on the surface thereof and two foil-like aluminum substrates 3a and 3b are further cut so as to have a predetermined size from an aluminum foil sheet whose surface is not roughened.

Then, one end portion region of the foil-like aluminum substrate 3a whose surface is not roughened and one end portion region of the foil-like aluminum substrate 3b whose surface is not roughened are superposed on the opposite end portion regions of the foil-like aluminum substrate 2 whose surface is roughened and which is formed with an aluminum oxide film 2x on the surface thereof in such a manner that end portion regions thereof having predetermined areas are overlapped.

The end portion region of the foil-like aluminum substrate 2 whose surface is roughened and the end portion region of the foil-like aluminum substrate 3a or 3b whose surface is not roughened superposed in this manner are connected to each other by ultrasonic welding, thereby forming a welding connected portion 4a or 4b. Here, the aluminum oxide film 2x is removed by connecting the end portion region of the foil-like aluminum substrate 3a or 3b whose surface is not roughened and the end portion region of the foil-like aluminum substrate 2 whose surface is roughened by ultrasonic welding, whereby the end portion region of the foil-like aluminum substrate 2 whose surface is roughened and the end portion region of the foil-like aluminum substrate 3a or 3b whose surface is not roughened are electrically connected to each other. The areas of the end portion region of the foil-like aluminum substrate 3a or 3b whose surface is not roughened and the end portion region of the foil-like aluminum substrate 2 to be superposed are determined so that the connected portion can have a predetermined strength.

Since the foil-like aluminum substrate 2 whose surface is roughened and which is formed with the aluminum oxide film 2x on the surface thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed electrode body 1 as an anodic electrode of a solid electrolytic capacitor.

Figure 3:
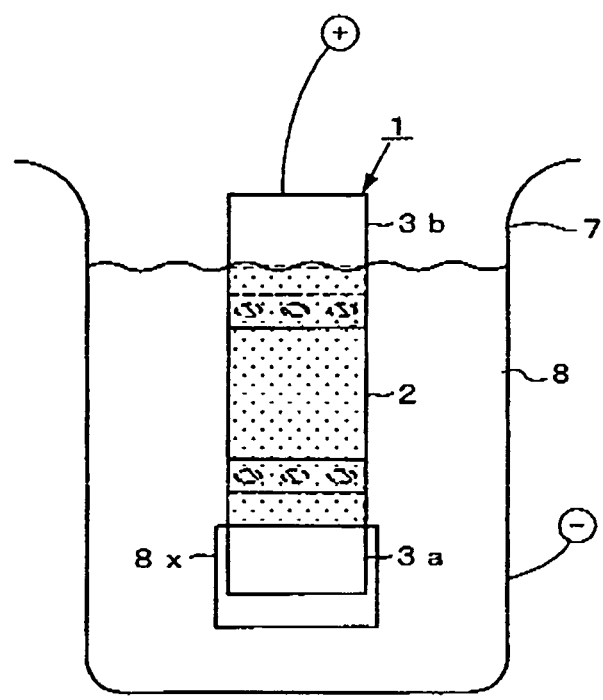
FIG. 3 is a schematic cross sectional view showing an anodic oxidization method for forming an aluminum oxide film on an edge portion of a foil-like aluminum substrate 2 whose surface is roughened.

FIG. 3 is a schematic cross sectional view showing an anodic oxidation method for forming an aluminum oxide film on an edge portion of the foil-like aluminum substrate 2 whose surface is roughened.

As shown in FIG. 3, a part of the foil-like aluminum substrate 3a whose surface is not roughened and which is not superposed on the foil-like aluminum substrate 2 whose surface is roughened is first masked with thermosetting resist 8x. Then, the electrode body 1 is set in a forming solution 8 consisting of an ammonium adipate solution accommodated in a beaker 7 made of stainless steel in such a manner that the whole foil-like aluminum substrate 2 whose surface is roughened, the whole foil-like aluminum substrate 3a which has been subjected to mask processing and a part of the foil-like aluminum substrate 3b which has not been subjected to mask processing are immersed in the forming solution 8 and voltage is applied with the foil-like aluminum substrate 3b whose surface is not roughened to the plus side and the beaker 7 made of stainless steel connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like aluminum substrate 3b beyond the connected portion of the foil-like aluminum substrate 2 whose surface is roughened and the foil-like aluminum substrate 3b whose surface is not roughened since the surface of the foil-like aluminum substrate 3b is not roughened. Further, since the part of the foil-like aluminum substrate 3a whose surface is not roughened is masked with thermosetting resist 8x, it does not come into contact with the forming solution 8.

Therefore, it is possible to reliably prevent the forming solution from coming into contact with tip end portion regions of the foil-like aluminum substrates 3a and 3b whose surfaces are not roughened and an aluminum oxide film is formed on only a region which includes the whole surface of the foil-like aluminum substrate 2 whose surface is roughened including an edge portion thereof and parts of the foil-like aluminum substrates 3a and 3b whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 1, a cathode electrode of conductive high molecular polymer or the like is formed by a well known process, thereby fabricating a solid electrolytic capacitor component.

Figure 4:
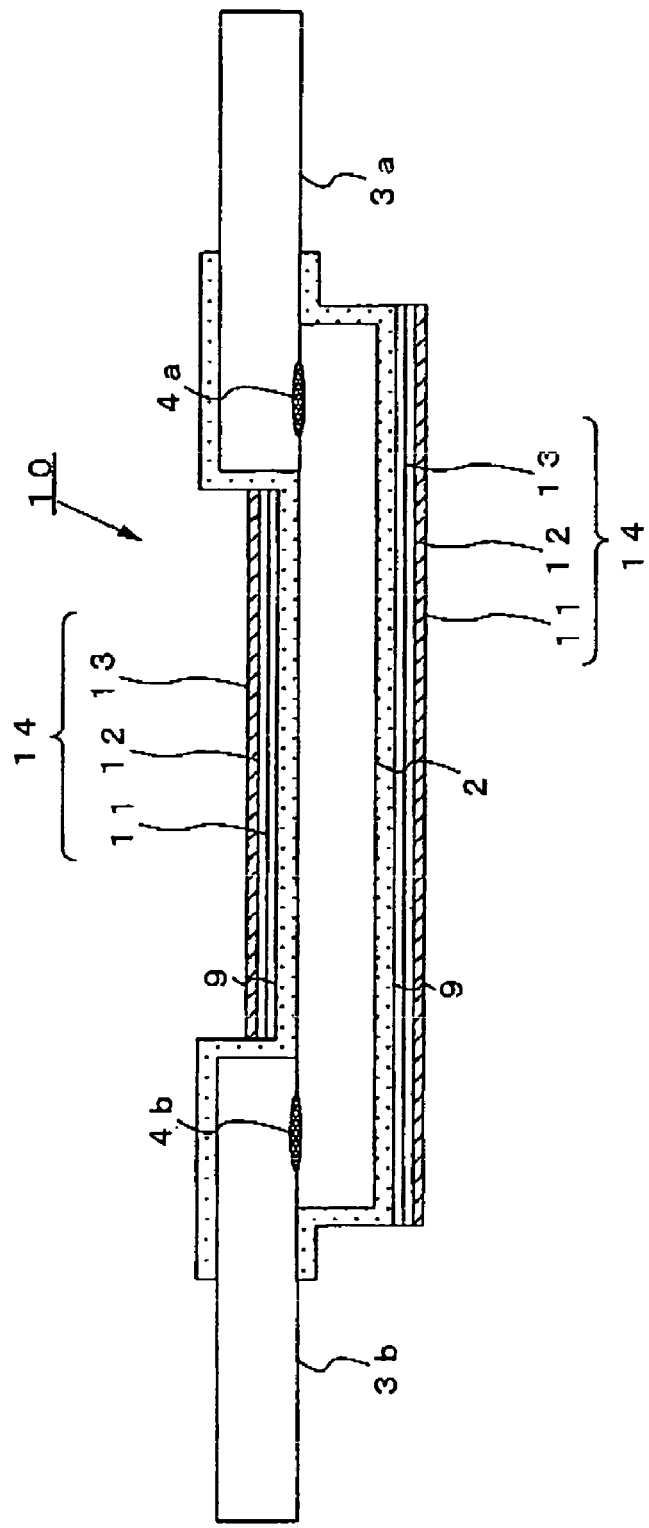
FIG. 4 is a schematic cross sectional view showing a solid electrolytic capacitor component.

FIG. 4 is a schematic cross sectional view showing a solid electrolytic capacitor component.

As shown in FIG. 4, the solid electrolytic capacitor component 10 includes a cathode electrode 14 formed by laminating a solid high molecular polymer electrolyte layer 11, a graphite paste layer 12 and a silver paste layer 13 on substantially the whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on substantially the whole surface of the foil-like aluminum substrate 2 whose surface is roughened and which is formed with the aluminum oxide film 9, and the graphite paste layer 12 and the silver paste layer 13 (conductive layers) are formed on the solid high molecular polymer electrolyte layer 11 by the screen printing method or the spray coating method.

The thus fabricated solid electrolytic capacitor component 10 is mounted on a lead frame after removing the mask of thermosetting resist 8x and the solid electrolytic capacitor component 10 is connected to an anode lead electrode and a cathode lead electrode formed in the lead frame in advance. Then, the solid electrolytic capacitor component 10 is molded, whereby a discrete type and three-terminal type solid electrolytic capacitor is fabricated.

Figure 5:
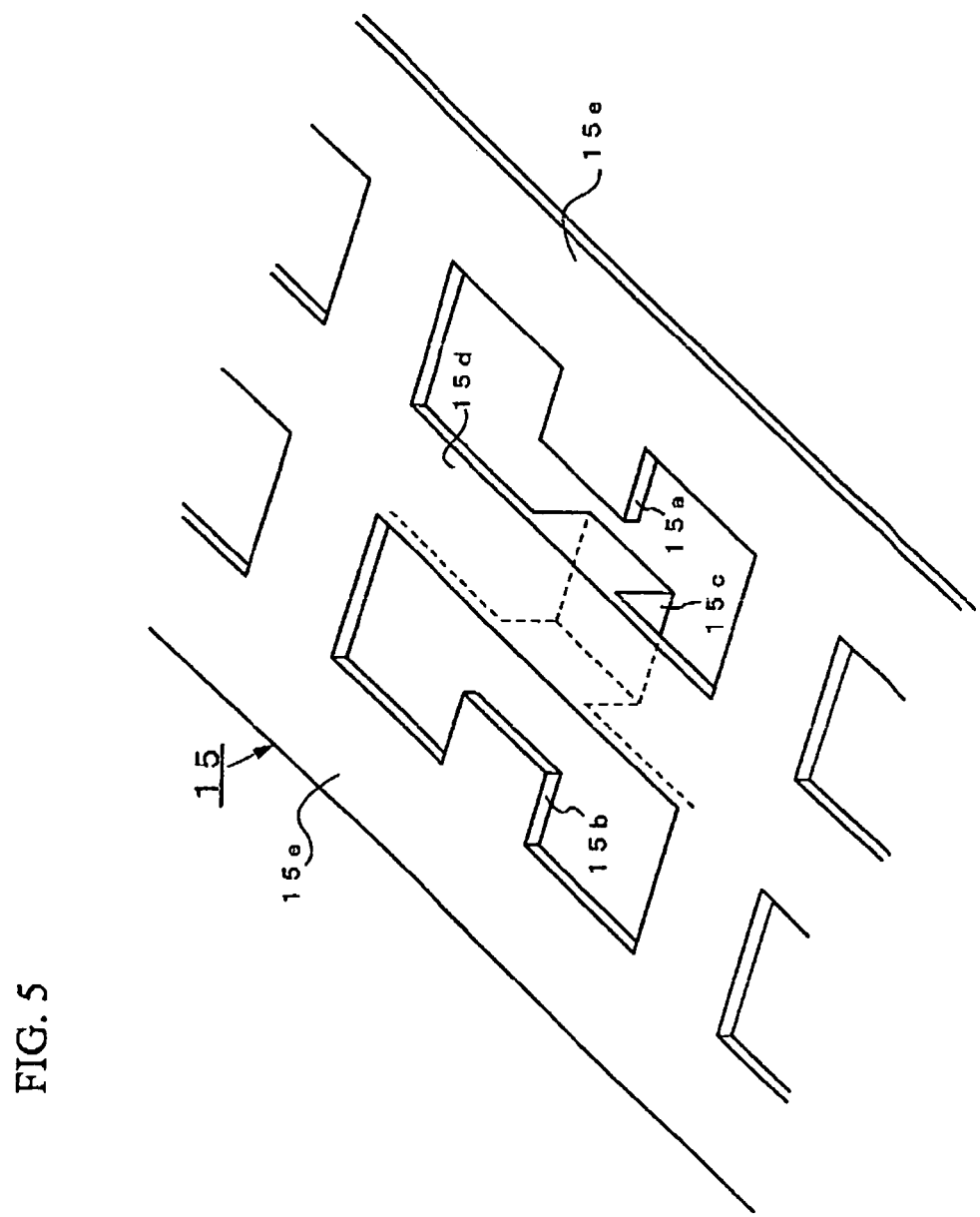
FIG. 5 is a schematic perspective view showing the structure of a lead frame.
Figure 6:
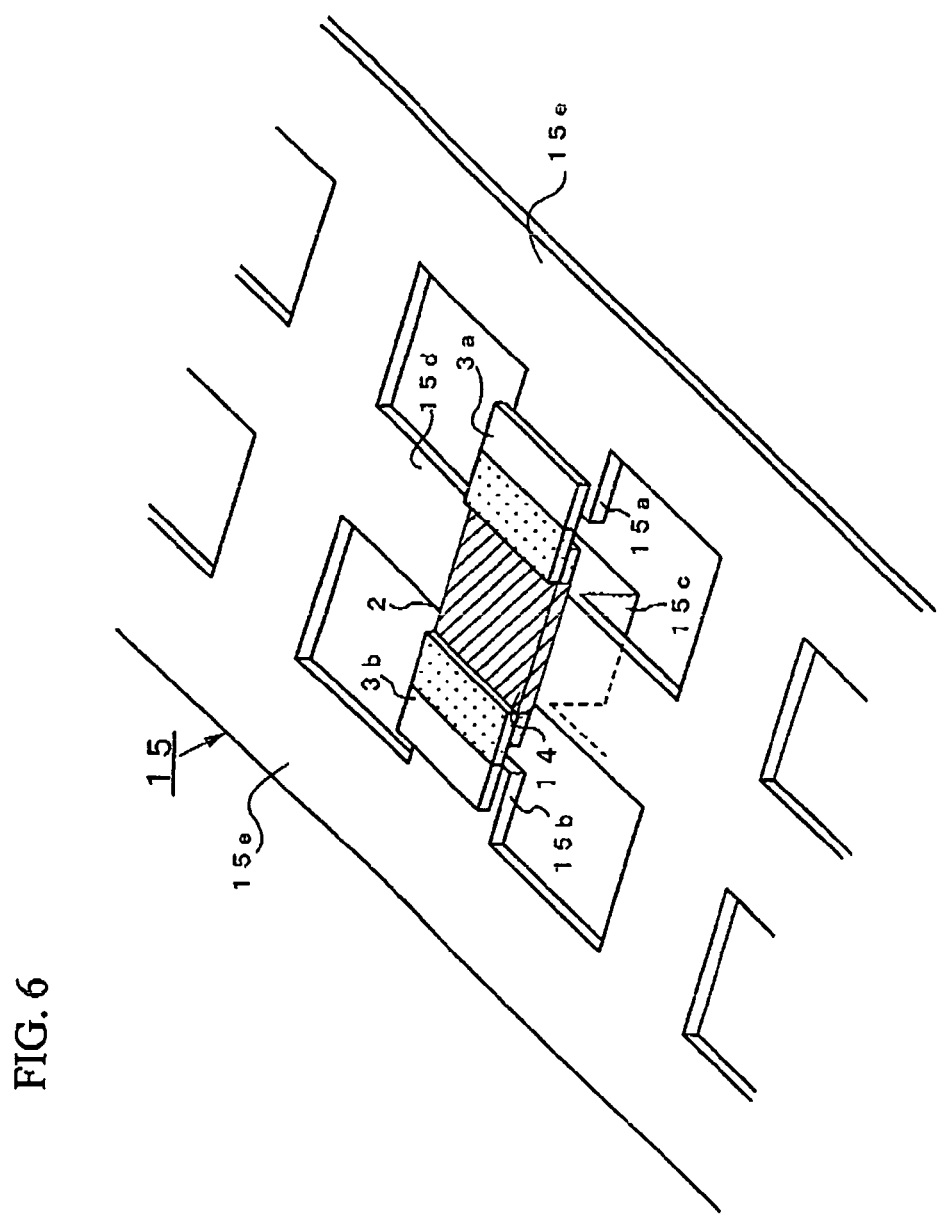
FIG. 6 is a schematic perspective view showing a plurality of solid electrolytic capacitor components mounted on a lead frame.

FIG. 5 is a schematic perspective view showing the structure of a lead frame and FIG. 6 is a schematic perspective view showing solid electrolytic capacitor components mounted on the lead frame.

As shown in FIGS. 5 and 6, the lead frame 15 is fabricated by punching out a phosphor bronze substrate so as to have a predetermined size. The central portion of the lead frame 15 is formed with a cathode lead portion 15c projecting downward and the cathode lead portion 15c is integrally formed with a center frame member 15d located between side frame members 15e. Further, in a direction perpendicular to the center frame member 15d, two anode lead portions 15a and 15b projecting from the side frame members 15e toward the central portion of the lead frame 15.

The solid electrolytic capacitor component 10 is mounted on the center portion of the center frame member 15d of the lead frame 15 and fixed by adhering the center frame member 15d and the conductive layer 13 located on the lower surface of the solid electrolytic capacitor component 10 using a silver system adhesive agent. The end portion regions of the foil-like aluminum substrates 3a and 3b whose surfaces are not roughened are superposed on the end portion regions of the two anode lead portions 15a and 15b formed in the lead frame 15 in advance and welded using a laser spot welding machine to be connected to the anode lead portions 15a and 15b.

Further, after the solid electrolytic capacitor component 10 has been fixed to the lead frame 15, it is molded with epoxy resin by injection molding or transfer molding so that a part of the cathode lead portion 15c is exposed from the bottom portion of the mold and are utilized as the cathode lead electrode.

Figure 7:
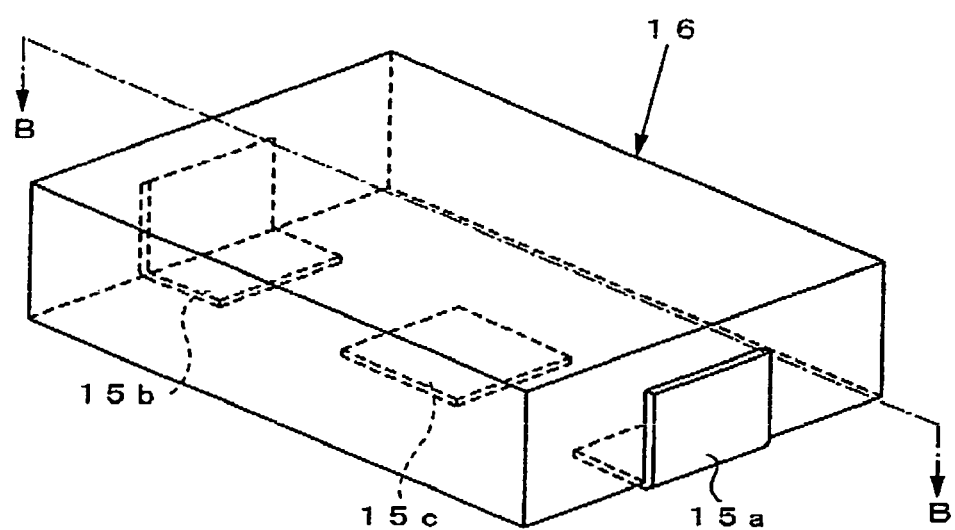
FIG. 7 is a schematic perspective view showing molded solid electrolytic capacitor.

FIG. 7 is a schematic perspective view showing the molded solid electrolytic capacitor, wherein the solid electrolytic capacitor component 10 is omitted.

As shown in FIG. 7, the solid electrolytic capacitor component molded with an epoxy resin 16 is removed from the lead frame and an anode lead electrode is formed by folding the anode lead portions 15a and 15b. Further, a cathode lead electrode is formed by exposing a part of the cathode lead portion 15c from the bottom portion of the mold.

Figure 8:
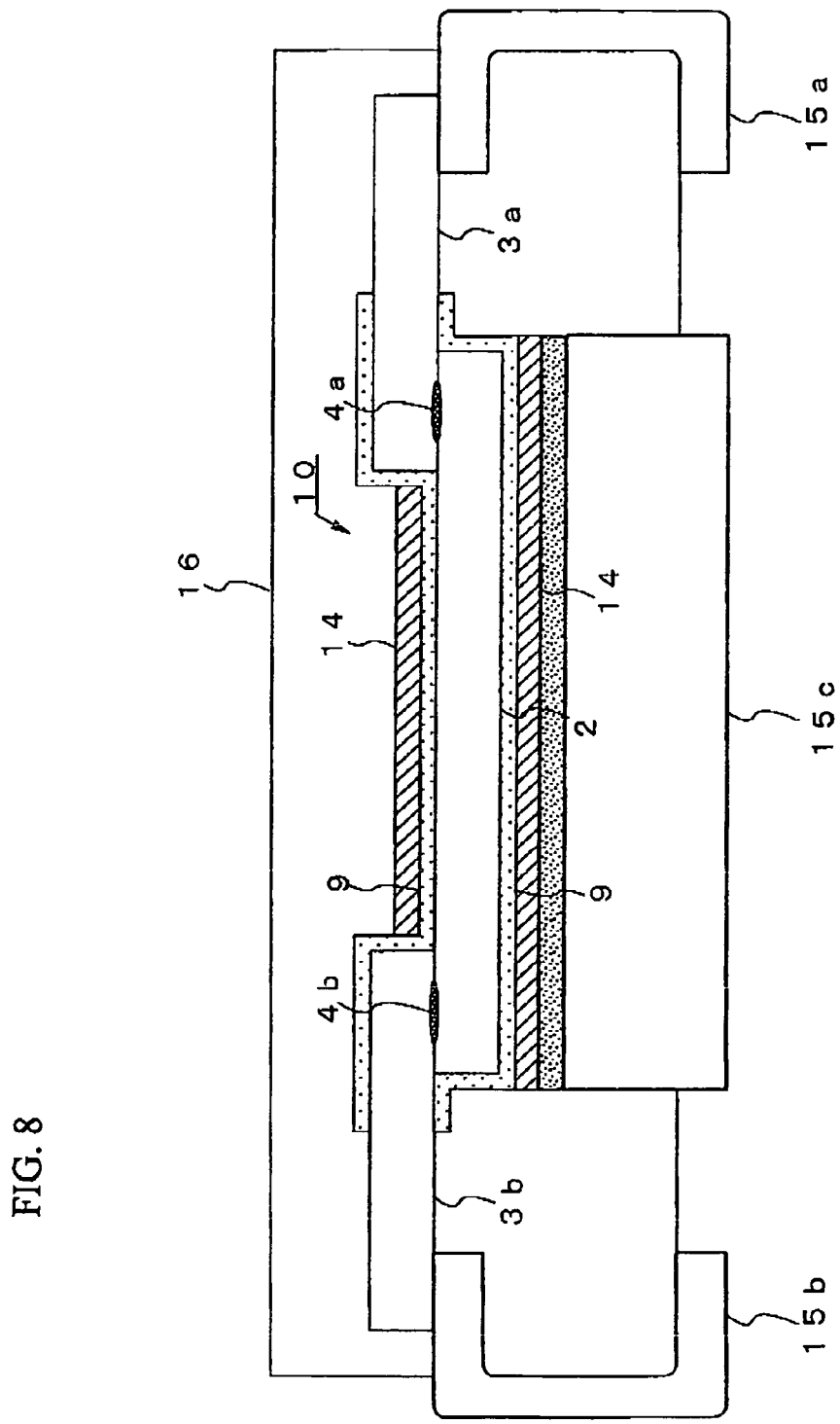
FIG. 8 is a schematic cross sectional view of a solid electrolytic capacitor taken along a line B-B in FIG. 7.

FIG. 8 is a schematic cross sectional view of the solid electrolytic capacitor taken along a line B-B in FIG. 7.

As shown in FIG. 8, a cathode electrode 14 is provided in the mold by sequentially forming the insulating oxide film, the solid high molecular polymer electrolyte layer and the conductive layer on the foil-like aluminum substrate 2 whose surface is roughened. To each of the opposite end portion regions of the foil-like aluminum substrate 2 whose surface is roughened, the one end portion region of the foil-like aluminum substrate 3a or foil-like aluminum substrate 3b whose surface is not roughened is bonded so that electrical connection can be established between the valve metals. To each of the other end portion regions of the foil-like aluminum substrate 2 whose surface is roughened, the one end portion region of the foil-like copper substrate 15a or 15b removed from the lead frame 15 is bonded so that electrical connection can be established between the metals, thereby forming the anode lead electrode. The cathode lead electrode 15c is drawn out from the conductive layer of the cathode electrode 14 formed on the foil-like aluminum substrate 2 whose surface is roughened in a direction perpendicular to the major surface of the foil-like aluminum substrate 2. Here, the major surface of the foil-like aluminum substrate 2 means a major surface of the foil-like aluminum substrate 2 among surfaces thereof but does not mean any of the edge surfaces of the foil-like aluminum substrate 2.

As described above, according to this embodiment, since the one end portion region of the foil-like aluminum substrate 3a or foil-like aluminum substrate 3b whose surface is not roughened is bonded to each of the opposite end portion regions of the foil-like aluminum substrate 2 whose surface is roughened and which is formed with the aluminum oxide film and the anode lead electrode 15a or 15b consisting of the lead frame is bonded to the other end portion region of the foil-like aluminum substrate 2, it is possible to fabricate a solid electrolytic capacitor component 10 having good electrical characteristics.

Further, according to this embodiment, since the solid electrolytic capacitor component 10 is constituted as a three-terminal type solid electrolytic capacitor component, it is possible to reduce the ESL by dividing the electrical current path obtain a solid electrolytic capacitor having good electric characteristics, i.e., whose initial characteristic values are good and do not vary substantially.

Furthermore, according to this embodiment, since the cathode lead electrode 15c is drawn out downward and perpendicularly from the conductive layer forming the cathode electrode formed on the bottom surface of the solid electrolytic capacitor component, it is possible to shorten the electrical current path and further reduce the ESL of the solid electrolytic capacitor component.

Figure 9:
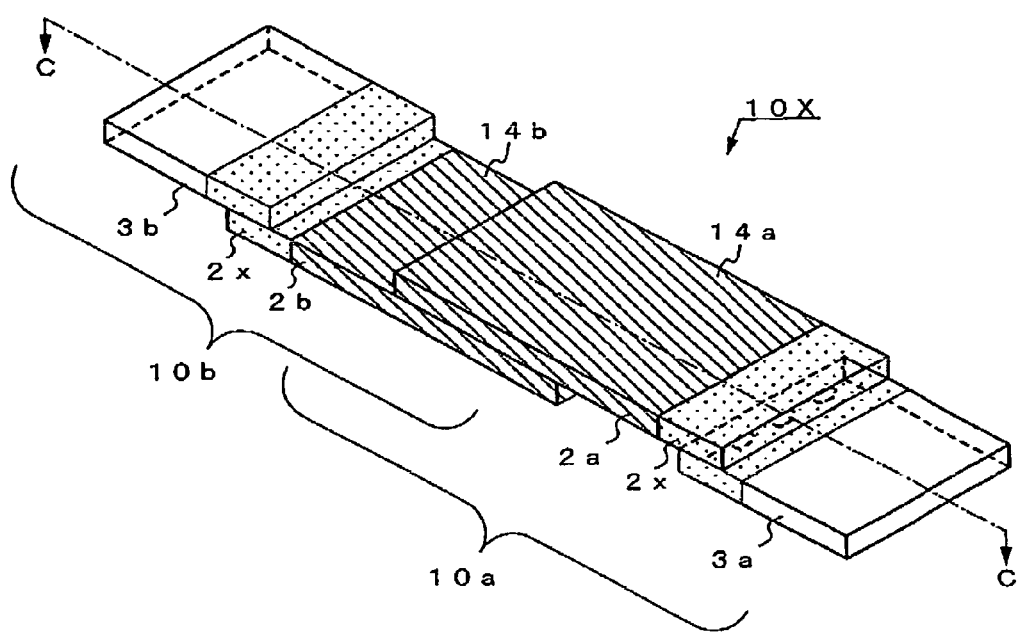
FIG. 9 is a schematic perspective view showing a solid electrolytic capacitor which is another preferred embodiment of the present invention.
Figure 10:
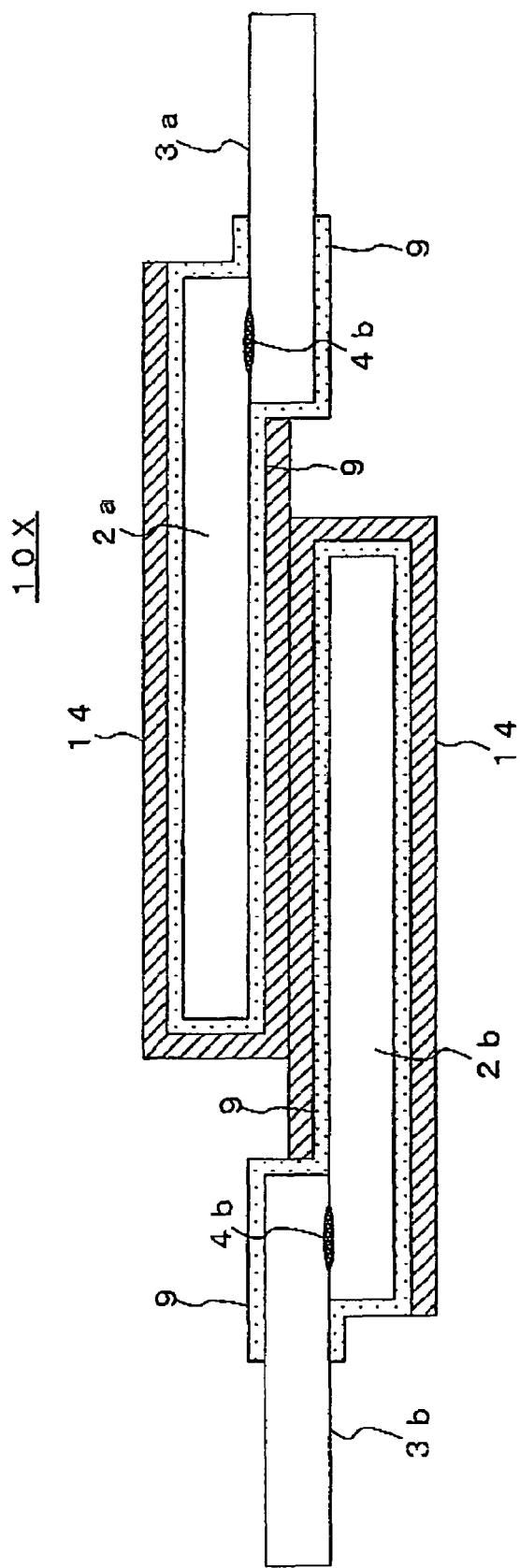
FIG. 10 is a schematic cross sectional view of a solid electrolytic capacitor taken along a line C-C in FIG. 9.

FIG. 9 is a schematic perspective view showing a solid electrolytic capacitor which is another preferred embodiment of the present invention and FIG. 10 is a schematic cross sectional view of the solid electrolytic capacitor taken along a line C-C in FIG. 9.

As shown in FIGS. 9 and 10, a solid electrolytic capacitor component 10X according to this embodiment is constituted by a laminate of two two-terminal type solid electrolytic capacitor components 10a and 10b.

The solid electrolytic capacitor component 10a includes a foil-like aluminum substrate 2a whose surface is roughened or enlarged and which is formed with an aluminum oxide film on the surface thereof as an insulating oxide film and a foil-like aluminum substrate 3a whose surface is not roughened, and a cathode electrode 14a including a solid high molecular polymer electrolyte layer, a graphite paste layer and a silver paste layer is formed on the foil-like aluminum substrate 2a whose surface is roughened and which is formed with an aluminum oxide film on the surface thereof. To one end portion region of the foil-like aluminum substrate 2a whose surface is roughened and which is formed with an aluminum oxide film on the surface thereof, one end portion region of the foil-like aluminum substrate 3a whose surface is not roughened is bonded so that electrical connection can be established by ultrasonic welding between the valve metals.

The solid electrolytic capacitor component 10b is similarly constituted and includes a foil-like aluminum substrate 2b whose surface is roughened or enlarged and which is formed with an aluminum oxide film on the surface thereof as an insulating oxide film and a foil-like aluminum substrate 3b whose surface is not roughened, and a cathode electrode 14b is formed on the foil-like aluminum substrate 2b. To one end portion region of the foil-like aluminum substrate 2b whose surface is roughened, one end portion region of the foil-like aluminum substrate 3b whose surface is not roughened is bonded so that electrical connection can be established by ultrasonic welding between the valve metals.

The two two-terminal type solid electrolytic capacitor components 10a and 10b are disposed to face each other in such a manner that the conductive layers thereof are electrically connected and end portion regions thereof are overlapped to form a laminate of the solid electrolytic capacitor components.

When the electrode body for a solid electrolytic capacitor component is to be formed, two foil-like aluminum substrates 3a and 3b are further cut so as to have a predetermined size from an aluminum foil sheet whose surface is not roughened.

Then, two foil-like aluminum substrates 2a and 2b are cut so as to have a predetermined size from an aluminum foil sheet whose surface is roughened and which is formed with an aluminum oxide film on the surface thereof.

Further, one end portion region of the foil-like aluminum substrate 3a or 3b whose surface is not roughened is superposed on one end portion region of the foil-like aluminum substrate 2a or 2b whose surface is roughened in such a manner that end portion regions thereof having predetermined areas are overlapped.

Then, the end portion region of the foil-like aluminum substrate 2a or 2b whose surface is roughened and the end portion region of the foil-like aluminum substrate 3a or 3b whose surface is not roughened superposed in this manner are connected to each other by ultrasonic welding, thereby forming a welding connected portion 4a or 4b. Here, the aluminum oxide film formed on the surface of the foil-like aluminum substrate 2a or 2b is removed by connecting the end portion region of the foil-like aluminum substrate 3a or 3b whose surface is not roughened and the end portion region of the foil-like aluminum substrate 2a or 2b whose surface is roughened by ultrasonic welding, whereby the end portion region of the foil-like aluminum substrate 3a or 3b whose surface is not roughened and the end portion region of the foil-like aluminum substrate 3a or 3b whose surface is roughened are electrically connected to each other. The areas of the end portion region of the foil-like aluminum substrate 3a or 3b and the end portion region of the foil-like aluminum substrate 2a or 2b to be superposed are determined so that the connected portion can have a predetermined strength.

Since each of the foil-like aluminum substrate 2a and 2b whose surfaces are roughened and which are formed with the aluminum oxide films on the surfaces thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use each of the thus formed two electrode bodies as an anodic electrode of a solid electrolytic capacitor.

Figure 11:
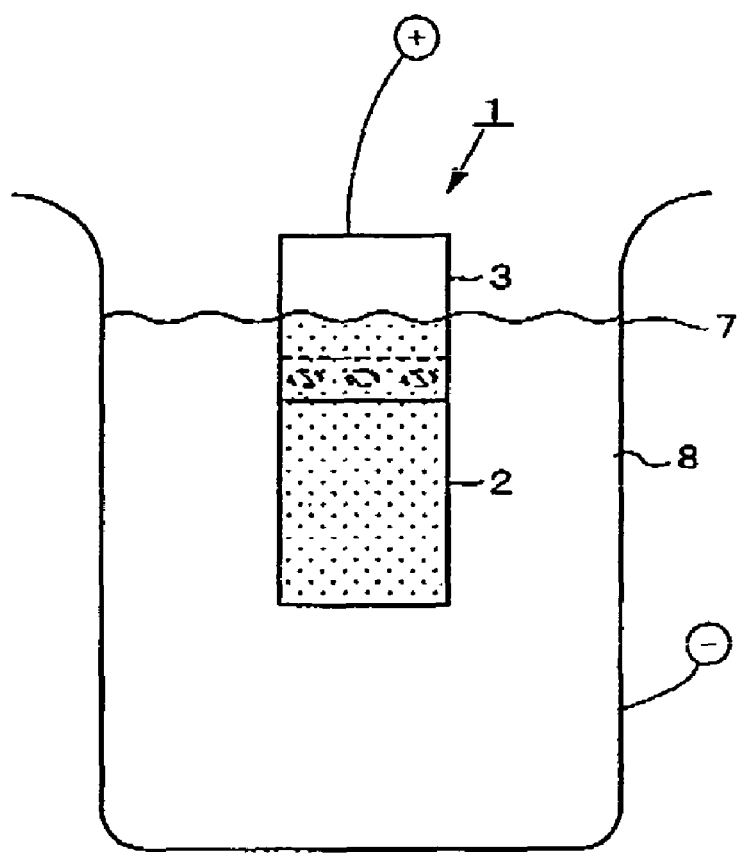
FIG. 11 is a schematic cross sectional view showing an anodic oxidization method for forming an aluminum oxide film on an edge portion of a foil-like aluminum substrate 2 whose surface is roughened.

FIG. 11 is a schematic cross sectional view showing an anodic oxidization method for forming an aluminum oxide film on an edge portion of a foil-like aluminum substrate 2 whose surface is roughened.

As shown in FIG. 11, each of the electrode bodies is set in a forming solution 8 consisting of an ammonium adipate solution accommodated in a beaker 7 made of stainless steel in such a manner that the whole foil-like aluminum substrate 2 whose surface is roughened and a part of the foil-like aluminum substrate 3 whose surface is not roughened and which is overlapped on the foil-like aluminum substrate 2 are immersed in the forming solution 8 and voltage is applied with the foil-like aluminum substrate 3 whose surface is not roughened to the plus side and the beaker 7 made of stainless steel connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like aluminum substrate 3 beyond the connected portion of the foil-like aluminum substrate 2 whose surface is roughened and the foil-like aluminum substrate 3 whose surface is not roughened since the surface of the foil-like aluminum substrate 3 is not roughened.

Therefore, an aluminum oxide film is formed on only a region which includes the whole surface of the foil-like aluminum substrate 2 whose surface is roughened including an edge portion thereof and a part of the foil-like aluminum substrate 3 whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 1, a cathode electrode of conductive high molecular polymer or the like is formed by a well known process, thereby fabricating the above mentioned solid electrolytic capacitor component 10a or 10b.

Further, after the solid electrolytic capacitor components 10a and 10b have been partly overlapped and integrated with each other, they are molded, thereby fabricating a discrete type and pseudo three-terminal type solid electrolytic capacitor component 10X.

Figure 12:
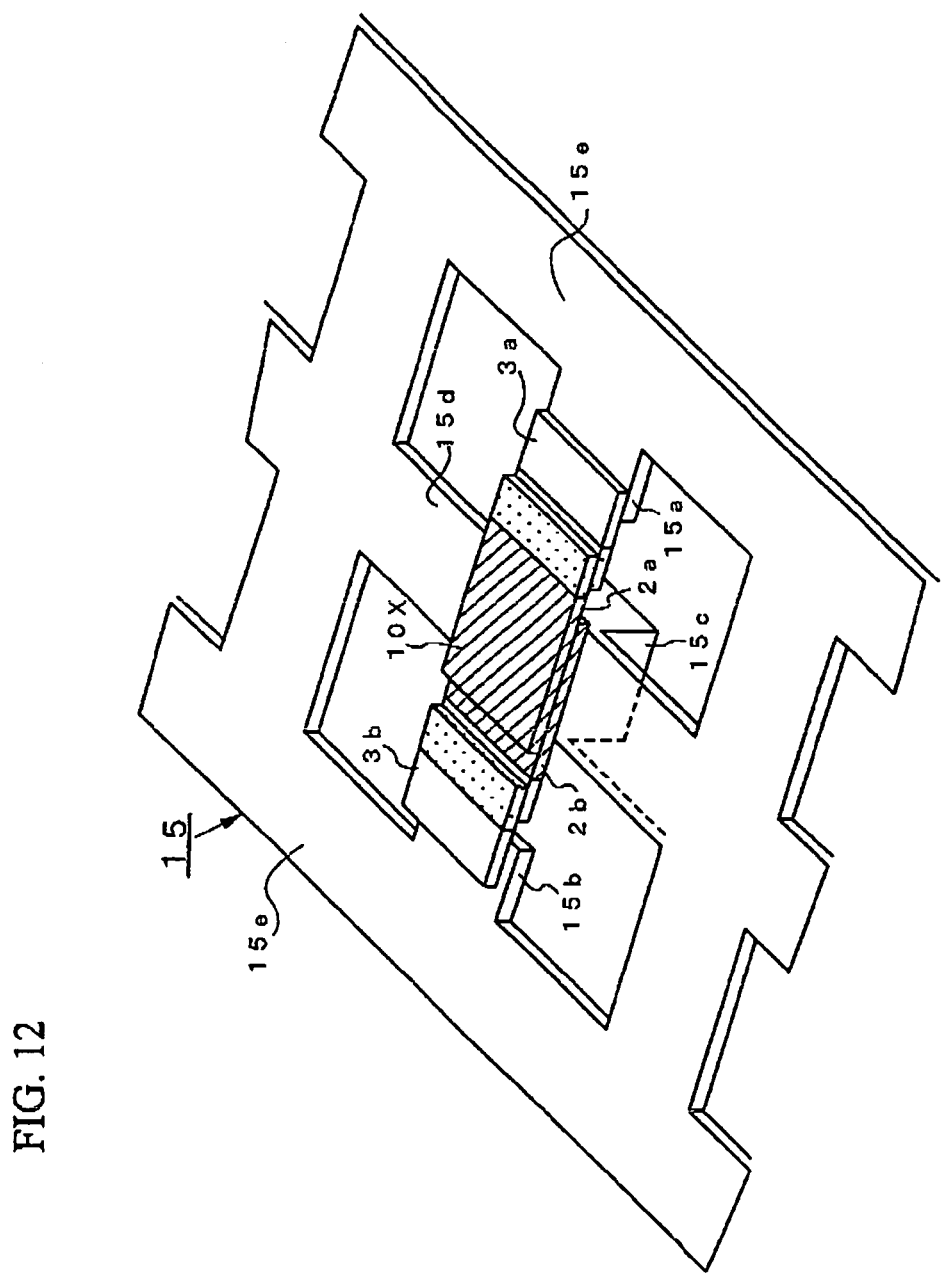
FIG. 12 is a schematic perspective view showing a plurality of solid electrolytic capacitor components mounted on a lead frame.

FIG. 12 is a schematic perspective view showing the solid electrolytic capacitor components 10X mounted on a lead frame.

As shown in FIG. 12, the lead frame 15 has substantially the same configuration as that of the lead frame shown in FIG. 5. A solid electrolytic capacitor 10 is mounted on a central portion of a center frame member 15d of the lead frame 15 and adhered and fixed to the lead frame using a silver system adhesive agent. The end portion regions of the foil-like aluminum substrates 3a and 3b whose surfaces are not roughened are superposed on the end portion regions of the two anode lead portions 15a and 15b formed in the lead frame 15 in advance and welded using a laser spot welding machine to be integrated with the anode lead portions 15a and 15b of the lead frame.

Further, after the solid electrolytic capacitor component 10X has been fixed to the lead frame 15, it is molded with epoxy resin by injection molding or transfer molding.

The molded solid electrolytic capacitor has substantially the same configuration as that of the solid electrolytic capacitor shown in FIG. 7 and is removed from the lead frame. Further, an anode lead electrode is formed by folding the anode lead portions 15a and 15b and a cathode lead electrode is formed by exposing a part of the cathode lead portion 15c from the bottom portion of the mold.

Figure 13:
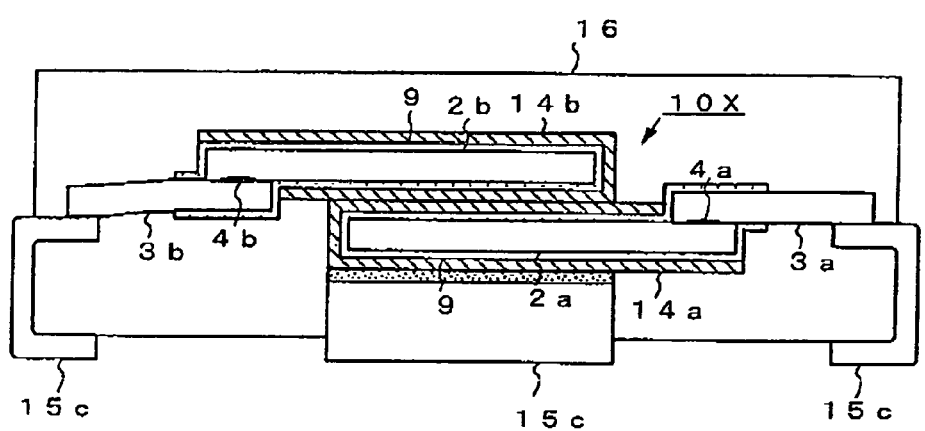
FIG. 13 is a schematic cross sectional view taken along a line B-B in FIG. 7.

FIG. 13 is a schematic cross sectional view taken along a line B-B in FIG. 7. As shown in FIG. 13, each of cathode electrodes 14a and 14b is provided by sequentially forming the insulating oxide film, the solid high molecular polymer electrolyte layer and the conductive layer on the foil-like aluminum substrate 2a or 2b which consists of the solid electrolytic capacitor component 10a or 10b and whose surface is roughened. To one end portion region of the foil-like aluminum substrate 2a or 2b whose surface is roughened, the one end portion region of the foil-like aluminum substrate 3a or 3b is whose surface is not roughened is bonded so that electrical connection can be established between the valve metals. To the other end portion region of the foil-like aluminum substrate 3a or 3b whose surface is not roughened, one end portion region of the foil-like copper substrate 15a or 15b removed from the lead frame 15 is bonded so that electrical connection can be established between the metals, thereby forming the anode lead electrode. The end portions of the two solid electrolytic capacitor components 10a and 10b are overlapped so as to electrically connect the conductive layers thereof, thereby forming a laminate 10X of the solid electrolytic capacitor components. The cathode lead electrode 15c is drawn out from the conductive layer of the cathode electrode 14a formed on the foil-like aluminum substrate 2a whose surface is roughened in a direction perpendicular to the major surface of the foil-like aluminum substrate 2a. Here, the major surface of the foil-like aluminum substrate 2a means a major surface of the foil-like aluminum substrate 2 among surfaces thereof but does not mean any of the edge surfaces of the foil-like aluminum substrate 2. the major surface is a surface exposed to the outside and the surface in contact with the foil-like aluminum substrate 2b is not a major surface.

As described above, according to this embodiment, since the one end portion region of the foil-like aluminum substrate 3a or foil-like aluminum substrate 3b whose surface is not roughened is bonded to each of the opposite end portion regions of the foil-like aluminum substrate 2a or 2b whose surface is roughened and which is formed with the aluminum oxide film and the anode lead electrode 15*a* or 15*b* consisting of the lead frame is bonded to the other end portion region of the foil-like aluminum substrate 2*a* or 2*b*, it is possible to fabricate a solid electrolytic capacitor component 10 having good electrical characteristics.

Further, according to this embodiment, since the solid electrolytic capacitor component 10 is constituted as a three-terminal type solid electrolytic capacitor component including the two two-terminal type solid electrolytic capacitor components, it is possible to reduce the ESL by dividing the electrical current path obtain a solid electrolytic capacitor having good electric characteristics, i.e., whose initial characteristic values are good and do not vary substantially.

Furthermore, according to this embodiment, since the cathode lead electrode 15*c* is drawn out downward and perpendicularly from the conductive layer forming the cathode electrode formed on the bottom surface of the solid electrolytic capacitor component, it is possible to shorten the electrical current path and further reduce the ESL of the solid electrolytic capacitor component.

Moreover, according to this embodiment, it is possible to reduce the ESL because, from the viewpoint of an equivalent circuit, the two two-terminal type solid electrolytic capacitor components are connected in parallel.

Figure 14:
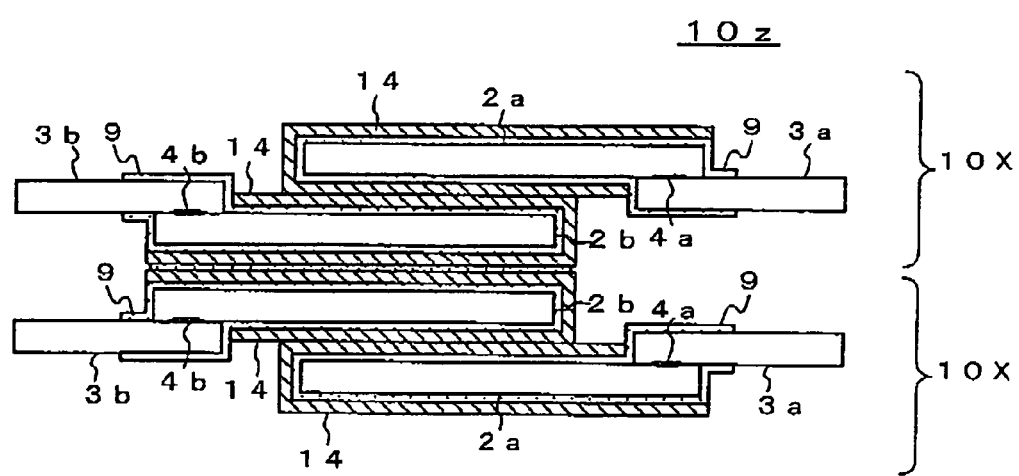
FIG. 14 is a schematic perspective view showing a solid electrolytic capacitor which is a further preferred embodiment of the present invention.

FIG. 14 is a schematic perspective view showing a solid electrolytic capacitor component which is a further preferred embodiment of the present invention.

As shown in FIG. 14, the solid electrolytic capacitor component 10Z is constituted by layering two solid electrolytic capacitor components 10X each consisting of the laminate including two two-terminal type solid electrolytic capacitor components shown in FIG. 9, and the laminate 10*x* of the solid electrolytic capacitor components and the laminate 10*y* of the solid electrolytic capacitor components are superposed so that cathode electrodes 14 face each other and are electrically connected and adhered to each other using a conductive adhering agent. After they have been mounted on a lead frame, the cathode electrodes thereof are bonded by ultrasonic welding together with anode lead portions thereof.

Although the thus constituted solid electrolytic capacitor component becomes slightly thicker, it is possible to provide a solid electrolytic capacitor component having electrostatic capacitance about twice that of the solid electrolytic capacitor component shown in FIG. 9 and effectively increase the electrostatic capacitance of the solid electrolytic capacitor component. Here, although explanation was made as to a solid electrolytic capacitor component obtained by layering two solid electrolytic capacitor components in this embodiment, the number of layered solid electrolytic capacitor components is not limited to two and the number thereof can be arbitrarily determined in accordance with the electrostatic capacitance and the height required for a solid electrolytic capacitor component.

Figure 15:
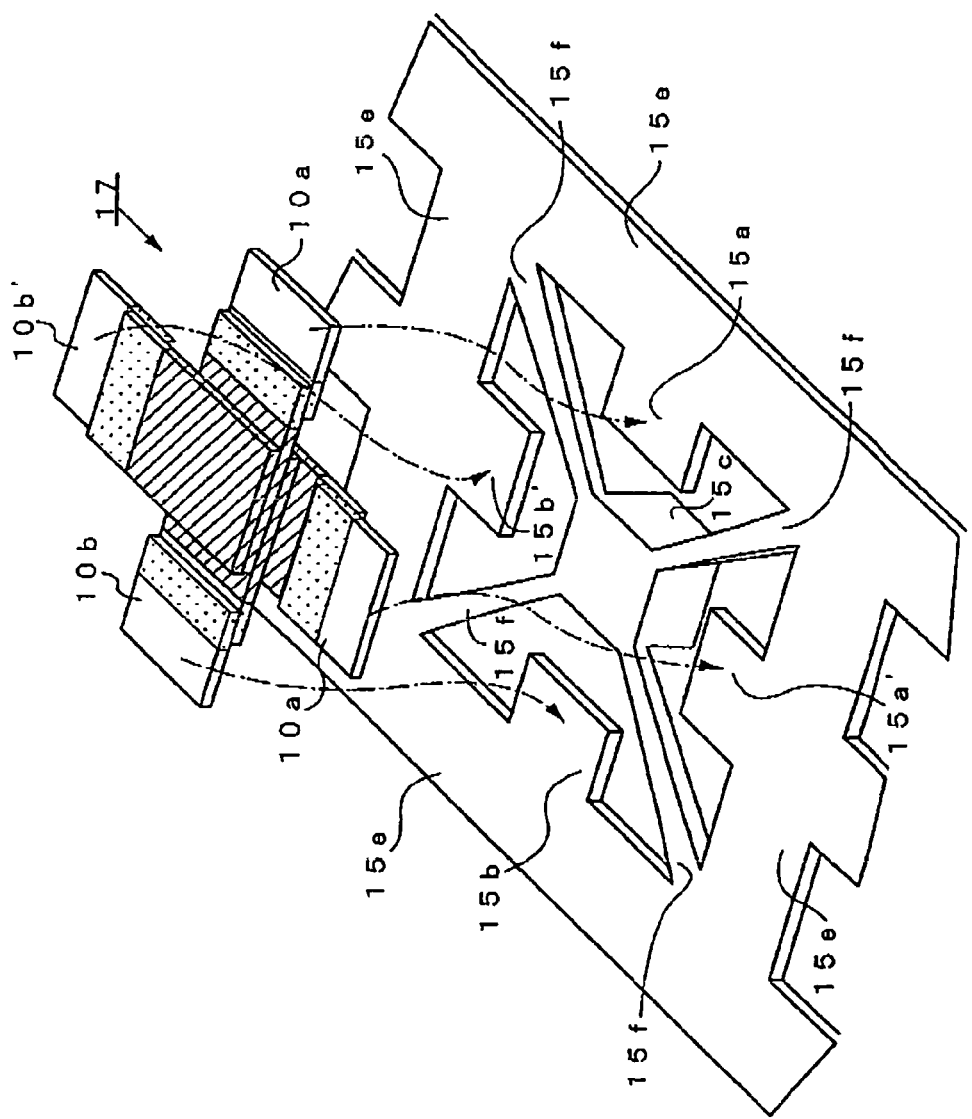
FIG. 15 is a schematic perspective view showing a solid electrolytic capacitor which is a further preferred embodiment of the present invention and the structure of a lead frame on which the solid electrolytic capacitor is to be mounted.

FIG. 15 is a schematic perspective view showing a solid electrolytic capacitor which is a further preferred embodiment of the present invention and the structure of a lead frame on which the solid electrolytic capacitor is to be mounted.

As shown in FIG. 15, the solid electrolytic capacitor according to this embodiment is constituted as a laminate of four two-terminal type solid electrolytic capacitor components 10*a*, 10*b*, 10*a*' and 10*b*'.

Each of the solid electrolytic capacitor components has a similar configuration to that of the solid electrolytic capacitor component shown in FIG. 9 and the four solid electrolytic capacitor components are disposed to be offset from each other by 90 degrees and end portion regions thereof are overlapped so that conductive layers thereof each forming a cathode electrode are electrically connected, thereby forming a laminate of the solid electrolytic capacitor components.

After overlapping the end portion regions of the solid electrolytic capacitor components 10*a*, 10*b*, 10*a*' and 10*b*' and integrating them with each other, they are molded to fabricate a discrete type and five-terminal type solid electrolytic capacitor.

The lead frame 15 has slightly different structure from that of the lead frame shown in FIG. 5 or 8 in that a cathode lead portion 15*c* is integrated with four sub-frame members 15*f* extending from four corners of the side frame members 15*e* surrounding the cathode lead portion 15*c* and four anode lead portions 15*a*, 15*b*, 15*a*' and 15*b*' are formed. The solid electrolytic capacitor 1 is mounted on the cathode lead portion 15*c* of the lead frame 15 and adhered and fixed to the lead frame using a silver system adhesive agent. End portion regions of foil-like aluminum substrates 3*a*, 3*b*, 3*a*' and 3*b*' whose surfaces are not roughened are superposed on the end portion regions of the anode lead portions 15*a*, 15*b*, 15*a*' and 15*b*' and welded using a laser spot welding machine, thereby being integrated with the anode lead portions of the lead frame.

Further, after the solid electrolytic capacitor has been fixed to the lead frame, it is molded with epoxy resin by injection molding or transfer molding so that a part of the cathode lead portions 15*c* is exposed from the bottom portion of the mold and are utilized as the cathode lead electrodes.

Figure 16:
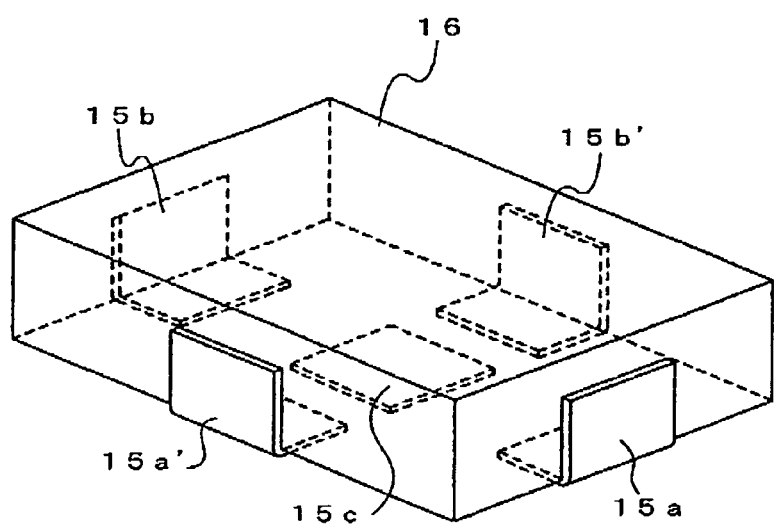
FIG. 16 is a schematic perspective view showing molded five-terminal type electrolytic capacitor.

The molded solid electrolytic capacitor is shown in FIG. 16 and it is removed from the lead frame. Four anode lead electrodes are formed by folding the anode lead portions 15*a*, 15*b*, 15*a*' and 15*b*' and a cathode lead electrode 15*c* is formed by exposing the cathode lead portion from the bottom portion of the mold 16.

Therefore, this solid electrolytic capacitor includes the four solid electrolytic capacitor components 10*a*, 10*b*, 10*a*' and 10*b*'. The insulating oxide film, the solid high molecular polymer electrolyte layer and the conductive layer are sequentially formed on the foil-like aluminum substrate whose surface is roughened and the four two-terminal type solid electrolytic capacitor components are disposed to be offset from each other by 90 degrees so that the conductive layers thereof each forming the cathode electrode are electrically connected and that the end portion regions thereof are overlapped, whereby the laminate of the solid electrolytic capacitor components are fabricated. The cathode lead electrode 15*c* is drawn out perpendicularly from the conductive layer formed on the bottom surface of the foil-like aluminum substrate 2 whose surface is roughened.

As described above, according to this embodiment, since the one end portion region of the foil-like aluminum substrate 3 whose surface is not roughened is bonded to the one end portion region of the foil-like aluminum substrate 2 whose surface is roughened and which is formed with the aluminum oxide film and the anode lead electrode 15 consisting of the copper substrate is bonded to the other end portion region of the foil-like aluminum substrate 2, it is possible to fabricate a solid electrolytic capacitor component 10 having good electrical characteristics.

Further, according to this embodiment, since the solid electrolytic capacitor component is constituted as a five-terminal type solid electrolytic capacitor component consisting of the laminate of the four two-terminal type solid electrolytic capacitor components, it is possible to reduce the ESL by dividing the electrical current path to obtain a solid electrolytic capacitor having good electric characteristics, i.e., whose initial characteristic values are good and do not vary substantially.

Furthermore, according to this embodiment, since the cathode lead electrode 15c is drawn out downward and perpendicularly from the conductive layer forming the cathode electrode formed on the bottom surface of the solid electrolytic capacitor component, it is possible to shorten an electrical current path and further reduce the ESL of the solid electrolytic capacitor component.

Moreover, according to this embodiment, since the solid electrolytic capacitor component is constituted by layering the four two-terminal type solid electrolytic capacitor components, it is possible to further increase the electrostatic capacitance of the solid electrolytic capacitor. Furthermore, it is possible to reduce the ESL because, from the viewpoint of an equivalent circuit, the four two-terminal type solid electrolytic capacitor components are connected in parallel.

Hereinafter, working examples and a comparative example will be set out in order to further clarify the advantages of the present invention.

WORKING EXAMPLE 1

A solid electrolytic capacitor according to a first embodiment was prepared in the following manner.

An aluminum foil was first cut from the sheet of an aluminum foil having a thickness of 100 μm whose surface was roughened and which was formed with an aluminum oxide film on the surface thereof so as to have a size of 5 mm×4 mm. Further, two aluminum foils were cut from the sheet of an aluminum foil having a thickness of 60 μm whose surface was not roughened so as to have a size of 2 mm×4 mm.

Then, one of the aluminum foils whose surface were not roughened was superposed on the aluminum foil whose surface was roughened in such a manner that end portion regions thereof were overlapped by 0.5 mm. Next, the end portion regions overlapped with each other were bonded and electrically connected using an ultrasonic welding machine, thereby fabricating a connected body of the aluminum foil whose surface was not roughened and the aluminum foil whose surface was roughened.

Further, the other aluminum foil whose surface was not roughened was superposed on the other end portion region of the aluminum foil whose surface was roughened in such a manner that end portion regions thereof were overlapped by 0.5 mm. Next, the end portion regions overlapped with each other were bonded and electrically connected using the ultrasonic welding machine, thereby fabricating a connected body of the two aluminum foils whose surface were not roughened and the aluminum foil whose surface was roughened.

Thus, an electrode body for a three-terminal type solid electrolytic capacitor component including the aluminum foil whose surface was not roughened, the aluminum foil whose surface was roughened and the aluminum foil whose surface was not roughened in this order was fabricated.

Among the two aluminum foils whose surfaces were not roughened formed at opposite end portion regions of the aluminum foil whose surface was roughened and which was formed with an aluminum oxide film in the thus fabricated electrode body for a three-terminal type solid electrolytic capacitor component, only one end portion region of the one of the aluminum foils was coated with resist. However, no resist was applied to the other aluminum foil whose surface was not roughened.

Further, as shown in FIG. 3, the thus fabricated electrode body was set in an aqueous solution of ammonium adipate prepared to have a concentration of 3% by weight, pH 6.0 so that the aluminum foil whose surface was roughened and which was formed with an aluminum oxide film and the whole portion coated with resist and subjected to a masking processing were completely immersed therein. At this time, a part of the aluminum foil which was not subjected to a masking processing among the two aluminum foils whose surfaces were not roughened was immersed in the aqueous solution of ammonium adipate but the tip end portion region thereof was not brought into contact with the aqueous solution of ammonium adipate.

An aluminum oxide film was then formed by connecting the aluminum foil which was not coated with resist and whose surface was not roughened to an anode, oxidizing the cut side surface of the aluminum foil immersed in the aqueous solution of ammonium adipate under the condition that a forming current density was set at 50 to 100 mA/cm$^2$ and a forming voltage was set equal to or lower than 35 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed of the aluminum oxide film was immersed therein and the solution was agitated for thirty minutes, thereby performing chemical oxidization polymerization. The same operation was repeated three times, thereby forming a solid high molecular polymer electrolyte layer containing polypyrrol. As a result, a solid high molecular polymer electrolyte layer having a thickness of about 50 μm was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and a portion of the aluminum foil whose surface was not roughened was exposed. Thus, a three-terminal type solid electrolytic capacitor component was fabricated.

Further, the thus fabricated solid electrolytic capacitor component was mounted on a lead frame processed so as to have a predetermined shape as shown in FIG. 5. A portion of the solid electrolytic capacitor component which was coated the paste layers was adhered onto the lead frame using a silver system conductive adhesive agent. Portions of the two aluminum foils whose surfaces were not roughened were welded using a "YAG Laser Spot Welding Machine" manufactured by NEC Corporation and integrated with an anode lead portion of the lead frame.

After the solid electrolytic capacitor component was fixed onto the lead frame, it was molded with epoxy resin using an injection molding or a transfer molding.

The thus molded solid electrolytic capacitor component was removed from the lead frame and the anode lead electrode was folded, thereby fabricating a discrete type solid electrolytic capacitor sample #1. Then, a predetermined voltage current was supplied to the solid electrolytic capacitor sample #1 by a well known method, thereby conducting aging and sufficiently lowering a leak electrical current. Thus, the solid electrolytic capacitor sample #1 was completed.

Electrostatic capacitance and the $S_{12}$ characteristic of the thus fabricated three-terminal type solid electrolytic capacitor sample #1 were measured using an "Impedance Analyzer 4294A" and a "Net Work Analyzer 8753D" manufactured by Agilient Technologies. Then, equivalent circuit simulation was performed based on the thus measured $S_{12}$ characteristic, thereby determining an ESR value and an ESL value.

As a result, the electrostatic capacitance of the solid electrolytic capacitor sample #1 at 120 Hz was 109.0 μF, the ESR value thereof at 100 kHz was 15 mΩ and the ESL value thereof at 100 kHz was 18 pH.

WORKING EXAMPLE 2

A solid electrolytic capacitor according to a second embodiment was prepared in the following manner.

An aluminum foil was first cut from the sheet of an aluminum foil having a thickness of 100 μm whose surface was roughened and which was formed with an aluminum oxide film on the surface thereof so as to have a size of 5 mm×4 mm. Further, an aluminum foils was cut from the sheet of an aluminum foil having a thickness of 60 μm whose surface was not roughened so as to have a size of 2 mm×4 mm. They were superposed in such a manner that one end portion regions thereof were overlapped by 0.5 mm and the superposed portions thereof were bonded and electrically connected using a "40 kHz-Ultrasonic Welding Machine" manufactured by Branson Ultrasonics Division of Emerson Japan Limited, thereby forming a connected body of the aluminum foil whose surface was not roughened and the aluminum foil whose surface was roughened.

Thus, an electrode body for a two-terminal type solid electrolytic capacitor component including the aluminum foil whose surface was not roughened and the aluminum foil which was formed with an aluminum oxide film on the surface thereof and whose surface was roughened in this order was fabricated.

Further, as shown in FIG. 11, the thus fabricated electrode body was set in an aqueous solution of ammonium adipate prepared to have a concentration of 3% by weight, pH 6.0 so that the aluminum foil which was formed with an aluminum oxide film on the surface thereof and whose surface was roughened was completely immersed therein. At this time, a part of the aluminum foil whose surface was not roughened was immersed in the aqueous solution of ammonium adipate.

An aluminum oxide film was then formed by connecting the aluminum foil whose surface was not roughened to an anode, oxidizing the cut side surface of the aluminum foil immersed in the aqueous solution of ammonium adipate under the condition that a forming current density was set at 50 to 100 mA/cm$^2$ and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed of the aluminum oxide film was immersed therein and the solution was agitated for thirty minutes, thereby performing chemical oxidization polymerization. The same operation was repeated three times, thereby forming a solid high molecular polymer electrolyte layer containing polypyrrol. As a result, a solid high molecular polymer electrolyte layer having a thickness of about 50 μm was formed.

Carbon paste was coated on the surface of the thus obtained solid high molecular polymer electrolyte layer and silver paste was further coated on the carbon paste, thereby forming a conductive layer and fabricating a two-terminal type solid electrolytic capacitor component.

A total of four solid electrolytic capacitor components were prepared by repeating the above steps.

Among these, two of the solid electrolytic capacitor components were disposed to be offset from each other by 180 degrees and face each other as shown in FIG. 9 and were layered so that the paste layers were superposed on each other. Then, the paste layers thereof were adhered to each other using a conductive adhesive agent to be integrated with each other.

In this manner, a total of two laminates of the solid electrolytic capacitor components formed by integrating two solid electrolytic capacitor components were fabricated. Further, as shown in FIG. 14, the laminates of the solid electrolytic capacitor components were layered in such a manner that the conductive layers including the paste layers faced each other and the conductive layers were adhered to each other using a silver system conductive adhesive agent, thereby integrating them. At this time, the anode electrodes thereof were not bonded to each other.

The thus fabricated laminate of the solid electrolytic capacitor components was mounted on a lead frame processed so as to have a predetermined shape as shown in FIG. 5. A portion of the laminate of the solid electrolytic capacitor components which was coated the paste layers was adhered onto the lead frame using a silver system conductive adhesive agent. Portions of the two aluminum foils whose surfaces were not roughened was welded using a "YAG Laser Spot Welding Machine" manufactured by NEC Corporation and integrated with an anode lead portion of the lead frame.

After the laminate of the solid electrolytic capacitor components was fixed onto the lead frame, it was molded with epoxy resin using an injection molding or a transfer molding.

The thus molded laminate of the electrolytic capacitor components was removed from the lead frame and the anode lead electrode was folded, thereby fabricating a discrete type solid electrolytic capacitor sample #2. Then, a predetermined voltage current was supplied to the solid electrolytic capacitor sample #2 by a well known method, thereby conducting aging and sufficiently lowering a leak electrical current. Thus, the solid electrolytic capacitor sample #2 was completed.

Electrical characteristics of the thus fabricated three-terminal type solid electrolytic capacitor sample #2 were estimated in a similar manner to in Working Example 1.

As a result, the electrostatic capacitance of the solid electrolytic capacitor sample #2 at 120 Hz was 105.0 μF, the ESR value thereof at 100 kHz was 8 mΩ and the ESL value thereof at 100 kHz was 20 pH.

WORKING EXAMPLE 3

A solid electrolytic capacitor according to a third embodiment was prepared in the following manner.

Similarly to in Working Example 2, a total of four two-terminal type solid electrolytic capacitor components were prepared.

As shown in FIG. 15, these four solid electrolytic capacitor components were disposed to be offset from each other by 90 degrees and were layered in such a manner that the paste layers thereof were superposed on each other and the paste layers thereof were adhered using a silver system conductive adhesive agent, thereby integrating the four solid electrolytic capacitor components with each other.

The thus fabricated laminate of the solid electrolytic capacitor components was mounted on a lead frame processed so as to have a predetermined shape as shown in FIG. 14. A portion of the solid electrolytic capacitor component which was coated the paste layers was adhered onto the lead frame using a silver system conductive adhesive agent. Portions of the four aluminum foils whose surfaces were not roughened was welded using a "YAG Laser Spot Welding Machine" manufactured by NEC Corporation and integrated with an anode lead portion of the lead frame.

After the laminate of the solid electrolytic capacitor components was fixed onto the lead frame, it was molded with epoxy resin using an injection molding or a transfer molding.

The thus molded laminate of the electrolytic capacitor components was removed from the lead frame and the anode lead electrode was folded, thereby fabricating a discrete type solid electrolytic capacitor sample #3. Then, a predetermined voltage current was supplied to the solid electrolytic capacitor sample #3 by a well known method, thereby conducting aging and sufficiently lowering a leak electrical current. Thus, the solid electrolytic capacitor sample #3 was completed.

Electrical characteristics of the thus fabricated three-terminal type solid electrolytic capacitor sample #3 were estimated in a similar manner to in Working Example 1.

As a result, the electrostatic capacitance of the solid electrolytic capacitor sample #3 at 120 Hz was 110.0 µF, the ESR value thereof at 100 kHz was 5 mΩ and the ESL value thereof at 100 kHz was 18 pH.

COMPARATIVE EXAMPLE 1

An aluminum foil was first cut from the sheet of an aluminum foil having a thickness of 100 µm which was formed with an aluminum oxide film on the surface thereof and whose surface was roughened so as to have a size of 7 mm×4 mm. Further, an aluminum foils was cut from the sheet of an aluminum foil having a thickness of 60 µm whose surface was not roughened so as to have a size of 2 mm×4 mm. They were superposed in such a manner that one end portion regions thereof were overlapped by 0.5 mm and the superposed portions thereof were bonded and electrically connected using a "40 kHz-Ultrasonic Welding Machine" manufactured by Branson Ultrasonics Division of Emerson Japan Limited, thereby forming a connected body of the aluminum foil whose surface was roughened and the aluminum foil whose surface was not roughened.

Thus, an electrode body for a two terminal-type solid electrolytic capacitor component including the aluminum foil whose surface was not roughened and the aluminum foil which was formed with an aluminum oxide film on the surface thereof and whose surface was roughened in this order was fabricated.

Figure 17:
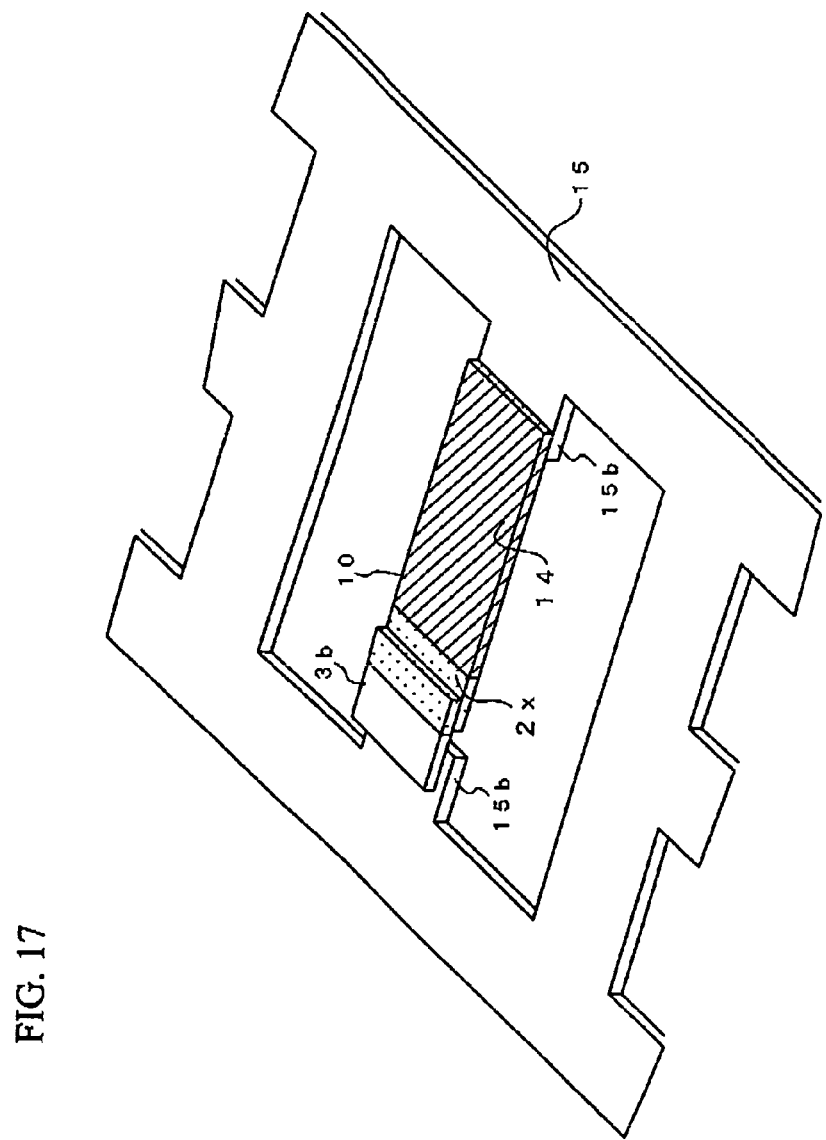
FIG. 17 is a schematic perspective view showing a two-terminal type electrolytic capacitor mounted on a lead frame, which is a comparative example of the present invention.
Figure 18:
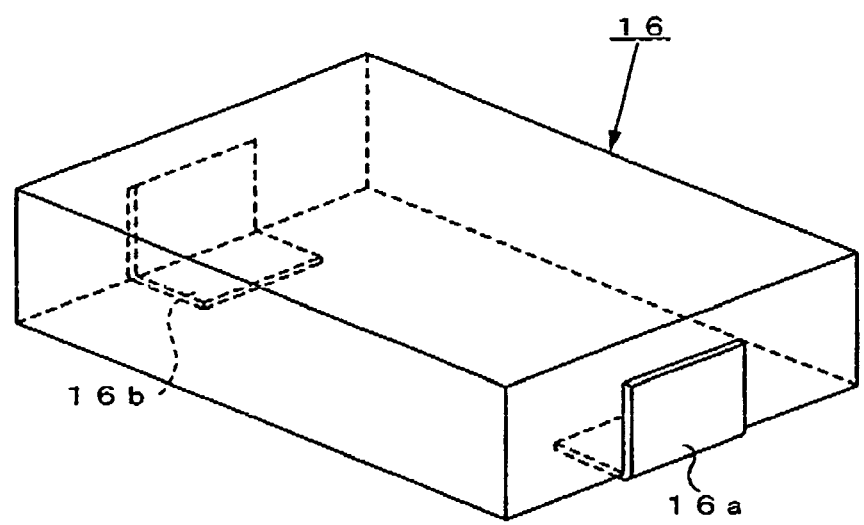
FIG. 18 is a schematic perspective view showing a discrete-type and two-terminal type electrolytic capacitor mounted on a lead frame, which is a comparative example of the present invention.

The thus fabricated electrode body for a two-terminal type solid electrolytic capacitor component was processed in a substantially similarly manner to that in Working Example 1 and mounted on a lead frame processed so as to have a predetermined shape as shown in FIG. 17, thereby fabricating a discrete type solid electrolytic capacitor sample #4.

Electrical characteristics of the thus fabricated three-terminal type solid electrolytic capacitor sample #4 were estimated in a similar manner to in Working Example 1.

It was found that the electrostatic capacitance of the solid electrolytic capacitor sample #4 at 120 Hz was 100 µF, the ESR value thereof at 100 kHz was 45 mΩ and the ESL value thereof at 100 kHz was 1500 pH.

From Working Examples 1 to 3 and Comparative Example 1, it was found that each of the solid electrolytic capacitor samples #1 to #3 according to the present invention had good electrostatic capacitance, ESR characteristic and ESL characteristic irrespective of how the foils were bonded, the material of electrical conductors and the kind of the solid high molecular polymer, and that that in the solid electrolytic capacitor sample #4 according to Comparative Example 1, the ESR characteristic and ESL characteristic were poor and in particular, the ESL characteristic was extremely poor.

The present invention has thus been shown and described with reference to specific embodiments and Working Examples. However, it should be noted that the present invention is in no way limited to the details of the described arrangements but changes and modifications may be made without departing from the scope of the appended claims.

For example, in the above described embodiments, although the laminate of the solid electrolytic capacitor components is formed by layering two solid electrolytic capacitor components or four solid electrolytic capacitor components, it is not absolutely necessary to form a laminate of solid electrolytic capacitor components in this manner and it is sufficient to form a laminate of solid electrolytic capacitor components with two or more solid electrolytic capacitor components and the number of solid electrolytic capacitor components used for forming the laminate is not particularly limited.

Further, for example, in the above described embodiments, although the two solid electrolytic capacitor components are disposed so as to be offset from each other by 180 degrees and face each other or the four solid electrolytic capacitor components are disposed so as to be offset from each other by 90 degrees and face each other, the angle between neighboring solid electrolytic capacitor components is not particularly limited and it is sufficient to dispose solid electrolytic capacitor components so as to face each other with a predetermined angle in such a manner that the solid electrolytic capacitor components are superposed on each other and integrated with each other so that conductive layers of the solid electrolytic capacitor components are electrically connected, thereby fabricating a laminate of the solid electrolytic capacitor components.

Moreover, in the above described embodiments, although the two solid electrolytic capacitor components are disposed so as to be offset from each other by 180 degrees and face each other, three solid electrolytic capacitor components may be disposed so as to be offset from each other by 180 degrees and face each other. In the case of disposing three solid electrolytic capacitor components so as to be offset from each other by 180 degrees and face each other, conductive layers thereof are superposed on each other and the three solid electrolytic capacitor components are layered in such a manner that two solid electrolytic capacitor components are disposed on one side and one solid electrolytic capacitor component is disposed on the other side.

Further, in the above described embodiments, although the aluminum substrate is used as the valve metal substrate 2, 3, the valve metal substrate 2, 3 may be formed of aluminum alloy, or tantalum, titanium, niobium, zirconium or alloy thereof instead of aluminum.

Moreover, in the above described embodiments, although the foil-like copper substrate is used as a metal conductor for constituting a lead electrode, the metal conductor may be formed of copper alloy, or brass, nickel, zinc, chromium or alloy thereof instead of copper.

Further, in the above described embodiments, the foil-like aluminum substrate 2 whose surface is roughened and the foil-like aluminum substrate 3 whose surface is not roughened are connected by ultrasonic welding and the foil-like aluminum substrate 3 whose surface is not roughened and the foil-like copper substrate 4 are connected by ultrasonic welding. However, both connected portions or one of them may be formed by cold welding instead of ultrasonic welding.

Furthermore, in the above described embodiments, although the surface of the foil-like aluminum substrate 2 is roughened so as to increase the specific surface thereof, it is not absolutely necessary in the present invention for the surface of the foil-like aluminum substrate 2 to be roughened.

Moreover, in the above described embodiments, although the foil-like aluminum substrate 3a, 3b whose surface is not roughened is bonded to the foil-like aluminum substrate 2 whose surface is roughened, it is not absolutely necessary in the present invention for the aluminum substrates to be foil-like and each of the aluminum substrates may be a frame-like or block-like substrate having a larger thickness, for example. Further, it is not absolutely necessary for the copper substrates to be foil-like and each of the copper substrates may be frame-like or block-like.

According to the present invention, it is possible to provide a solid electrolytic capacitor and a method for manufacturing a solid electrolytic capacitor which is constituted by sequentially forming an insulating oxide film, a solid high molecular polymer electrolyte layer and a conductive layer on a foil-like valve metal substrate whose surface is roughened and which is formed with an insulating oxide film on the surface thereof and can reduce the ESL and the ESR and increase electrostatic capacitance.

The invention claimed is:

1. A solid electrolytic capacitor comprising:
   a foil-like valve metal substrate formed with an insulating oxide film on the surface thereof;
   a valve metal body whose one end portion region is bonded to one of two opposite end portion regions of the foil-like valve metal substrate so that electric connection can be established between the valve metals;
   a conductive metal substrate whose one end portion region is bonded to the other end portion region of the foil-like valve metal substrate so that electric connection can be established between the metals;
   and a cathode electrode formed by sequentially laminating at least a solid high molecular polymer electrolyte layer and a conductive layer on the surface of the foil-like valve metal substrate;
   a cathode lead electrode being drawn out from the cathode electrode in a direction perpendicular to one major surface of the foil-like valve metal substrate.

2. A solid electrolytic capacitor comprising:
   at least two solid electrolytic capacitor components each comprising a foil-like valve metal substrate formed with an insulating oxide film on the surface thereof;
   a valve metal body whose one end portion region is bonded to one of two opposite end portion regions of the foil-like valve metal substrate so that electric connection can be established between the valve metals;
   a conductive metal substrate whose one end portion region is bonded to the other end portion region of the foil-like valve metal substrate so that electric connection can be established between the metals;
   and a cathode electrode formed by sequentially laminating at least a solid high molecular polymer electrolyte layer and a conductive layer on the surface of the foil-like valve metal substrate;
   the at least two solid electrolytic capacitor components being partly overlapped so as to electrically connect the conductive layers thereof, thereby forming a laminate of the solid electrolytic capacitor components;
   a cathode lead electrode being drawn out from a surface of one of the cathode electrodes of the laminate of the solid electrolytic capacitor components in a direction perpendicular to one major surface of the foil-like valve metal substrate.

3. A solid electrolytic capacitor in accordance with claim 2 wherein two solid electrolytic capacitor components are disposed to face each other as rotated with respect to each other by 180 degrees.

4. A solid electrolytic capacitor in accordance with claim 2 wherein four solid electrolytic capacitor components are disposed to face each other as rotated with respect to each other by 90 degrees.

5. A method for manufacturing a solid electrolytic capacitor comprising steps of:
   bonding one end portion region of a valve metal body to one of two opposite end portion regions of a foil-like valve metal substrate formed with an insulating oxide film on the surface thereof so that electric connection can be established between the valve metals, thereby forming an electrode body for a solid electrolytic capacitor component;
   dipping the electrode body in a forming solution so that the whole foil-like valve metal substrate is dipped in the forming solution, applying voltage to the electrode body to effect anodic oxidization thereon and form an insulating oxide film at least at an edge portion of the foil-like valve metal substrate;
   forming a solid high molecular polymer electrolyte layer on substantially the entire surface of the foil-like valve metal substrate subjected to the anodic oxidization;
   coating the solid high molecular polymer electrolyte layer with a conductive paste and drying the conductive paste to form a conductive layer;
   removing the mask of the foil-like valve metal substrate;
   repeating these steps to fabricate at least two solid electrolytic capacitor components;
   partly overlapping the at least two solid electrolytic capacitor components so as to electrically connect the conductive layers thereof, thereby fabricating a laminate of the at least two solid electrolytic capacitor components;

mounting the at least two solid electrolytic capacitor components on a lead frame, bonding one end portion region of an anode lead portion formed in the lead frame in advance to the other end portion of the valve metal body, thereby forming an anode lead electrode, connecting a cathode lead portion formed in the lead frame in advance to the conductive layer, thereby forming a cathode lead electrode so as to be drawn out from the conductive layer in a direction perpendicular to one major surface of the foil-like valve metal substrate;

and molding the laminate of the solid electrolytic capacitor components fixed onto the lead frame with resin.

* * * * *